(12) United States Patent
Chaudhry

(10) Patent No.: US 8,200,968 B2
(45) Date of Patent: Jun. 12, 2012

(54) METHOD AND APPARATUS FOR COMMUNICATING BETWEEN A REQUESTOR AND A USER RECEIVING DEVICE USING A USER DEVICE LOCATING MODULE

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 965 days.

(21) Appl. No.: 11/960,984

(22) Filed: Dec. 20, 2007

(65) Prior Publication Data

US 2009/0164778 A1 Jun. 25, 2009

(51) Int. Cl.
*H04L 9/32* (2006.01)

(52) U.S. Cl. .................... 713/168; 370/352; 709/203

(58) Field of Classification Search .............. 713/168
See application file for complete search history.

(56) References Cited

U.S. PATENT DOCUMENTS

| | | | |
|---|---|---|---|
| 6,229,540 B1 | 5/2001 | Tonelli et al. | |
| 6,801,528 B2 | 10/2004 | Nassar | |
| 6,839,757 B1 | 1/2005 | Romano et al. | |
| 6,885,660 B2 * | 4/2005 | Inbar et al. | 370/352 |
| 7,027,460 B2 | 4/2006 | Iyer et al. | |
| 7,054,447 B1 * | 5/2006 | Price, III | 380/278 |
| 7,069,312 B2 | 6/2006 | Kostic et al. | |
| 7,137,006 B1 | 11/2006 | Grandcolas et al. | |
| 7,194,759 B1 * | 3/2007 | Chess et al. | 726/2 |
| 7,356,584 B2 | 4/2008 | Yip | |
| 7,668,838 B2 * | 2/2010 | Baio et al. | 719/328 |

| | | | |
|---|---|---|---|
| 2002/0026643 A1 | 2/2002 | Ewen et al. | |
| 2003/0095791 A1 | 5/2003 | Barton et al. | |
| 2004/0039905 A1 | 2/2004 | Leoutsarakos | |
| 2004/0117430 A1 | 6/2004 | Bazot et al. | |
| 2004/0233897 A1 * | 11/2004 | Yamaguchi et al. | 370/352 |
| 2005/0050333 A1 | 3/2005 | Yeap et al. | |
| 2005/0086683 A1 | 4/2005 | Meyerson | |
| 2005/0125540 A1 | 6/2005 | Szu et al. | |
| 2005/0152287 A1 | 7/2005 | Yokomitsu et al. | |
| 2006/0031472 A1 | 2/2006 | Rajavelu et al. | |
| 2006/0036847 A1 | 2/2006 | Bush et al. | |
| 2006/0056397 A1 | 3/2006 | Aizu et al. | |

(Continued)

FOREIGN PATENT DOCUMENTS

WO 2007074359 A1 7/2007

OTHER PUBLICATIONS

Pennerath, Frederic; Marynissen, Gert; "WANConnectionDevice:1 Device Template Version 1.01"; UPNP Forum; Nov. 12, 2001; XP002521778; retrieved from the Internet: URL:http://www.upnp.org/standardizeddcps/documents/UPnP_IGD_WANDevice%201.0.pdf; Section 2.4.16.

(Continued)

*Primary Examiner* — Krista Zele
*Assistant Examiner* — Andrew Georgandellis

(57) ABSTRACT

A system and method for communicating between a user device locator module and a user receiving device includes forming a secure connection with a user device locator module. The user receiving device communicates user identifier data and port data to the user device locator module. An authentication module authenticates the user data from the user device locator module and generates an authentication signal. The user device locator module registers the port data at the user device locator module in response to the authentication signal.

28 Claims, 18 Drawing Sheets

U.S. PATENT DOCUMENTS

| | | | |
|---|---|---|---|
| 2006/0117342 | A1 | 6/2006 | Park et al. |
| 2006/0242322 | A1 | 10/2006 | Williams et al. |
| 2007/0130286 | A1 | 6/2007 | Hopmann et al. |
| 2007/0162748 | A1 | 7/2007 | Okayama et al. |
| 2007/0214103 | A1 | 9/2007 | Manthoulis |
| 2007/0217434 | A1 | 9/2007 | Welbourn |
| 2007/0233879 | A1 | 10/2007 | Woods et al. |
| 2007/0266026 | A1* | 11/2007 | Aravamudan et al. ............ 707/7 |
| 2007/0274327 | A1 | 11/2007 | Kaarela et al. |
| 2008/0112405 | A1 | 5/2008 | Cholas et al. |
| 2008/0235513 | A1 | 9/2008 | Foster et al. |
| 2009/0129301 | A1 | 5/2009 | Belimpasakis |
| 2009/0207905 | A1 | 8/2009 | Tomita |
| 2010/0180322 | A1 | 7/2010 | Finn et al. |
| 2010/0241748 | A1 | 9/2010 | Ansari et al. |

OTHER PUBLICATIONS

Contributors: Allegro Software Development Corporation, Conexant Systems, Inc., Intel Corporation, Microsoft Corporation, Motorola, Nokia Corporation, Philips Electronics, Pioneer, Sony Electronics; "UPnP Device Architecture 1.0"; UPNP Forum; Jul. 20, 2006; XP002521777; retrieved from the Internet: URL:http://www.upnp-ic.org/resources/UPnP_device_architecture_docs/UPnP-DeviceArchitecture-v1_0-20060720.pdf; p. 3, lines 8-18.

Vogel, Hans-Jorg; Weyl, Benjamin; Eichler, Stephan; "Federation Solutions for Inter-and Intradomain Security in Next-Generation Mobile Service Platforms", AEU International Journal of Electronics and Communications; Elsevier, Jena, DE; vol. 60, No. 1; Jan. 2, 2006; pp. 13-19; XP025183729; ISSN: 1434-8411 [retrieved on Jan. 2, 2006]; Section 3.

Warrier, Ulhas and Iyer, Prakash; WANDevice:1 Device Template Version 1.01 for UPnP Version 1.0; Nov. 12, 2001; pp. 1-12.

Selen, Kristian; "UPnP Security in Internet Gateway Devices"; 2006; retrieved from http://www.tml.tkk.fi/Publications/C/21/Selen_ready.pdf.

Secure Sockets Layer (SSL); 2000; retrieved from http://www.searchsecurity.techtarget.com/definition/Secure-Sockets-Layer-SSL.

Fiedler, Jens; Kupka, Tomas; Magedanz, Thomas; Kleis, Michael; "Reliable VoIP Services Using at Peer-to-Peer Intranet"; Proceedings of the Eighth IEEE International Symposium on Multimedia (ISM 2006).

WANIPConnection:1 Service Template Version 1.01; for UPnP Version 1.0; Nov. 2001.

Foldoc definition of HTTP; 2010; retrieved from http://www.foldoc.org.

Non-final Office action dated Jun. 17, 2011 in U.S. Appl. No. 11/960,951, filed Dec. 20, 2007 by Kapil Chaudhry.

UpnP-hacks; http://www.upnp-hacks.org/igd.html; 2006-2011.

Final Rejection dated Dec. 2, 2011 in U.S. Appl. No. 11/960,951, filed Dec. 20, 2007 by Kapil Chaudhry.

* cited by examiner

METHOD AND APPARATUS FOR COMMUNICATING BETWEEN A REQUESTOR AND A USER RECEIVING DEVICE USING A USER DEVICE LOCATING MODULE

TECHNICAL FIELD

The present disclosure relates generally to communication systems having a primary service provider and a partner service provider, and more particularly, to a method and system for allowing a partner service provider to communicate with a user receiving device within the primary service provider system.

BACKGROUND

The statements in this section merely provide background information related to the present disclosure and may not constitute prior art.

Communication systems such as pay communication systems include a primary service provider and a user device. The user device is typically provided with authorization to communicate with the primary service provider and receive services therefrom. One example of such a system is a satellite television system such as DIRECTV®. Conditional access is provided at the user device in the form of a card to allow the user device to receive signals from the primary service provider.

Allowing other service providers to interact with and provide different services that supplement the primary service, may be desirable. However, the supplemental service provider may not know if the user device is in communication with the supplemental service provider. In a broadband-type of communication system, the ports that the communication device communicates over or the IP address of the user device, or both, may be subject to change.

SUMMARY

The present disclosure allows a requester such as a partner service provider and a user device to establish communication therebetween. By establishing communication the user device may then be connected to different devices or services such from a partner service provider.

In one aspect of the invention, a method of communicating with a user receiving device includes forming a secure communication connection between a user device locator module and a requester, communicating a requester identifier, a site user identifier and an encrypted token, verifying the requester using the encrypted token, communicating user receiving device data from the user device locator module to the requester and communicating data between the requester and the user receiving device in response to the user receiving device data.

In yet another aspect of the invention, a system includes a user device locator module and a user receiving device forming a secure connection with a user device locator module. The user receiving device communicates user identifier data and port data to the user device locator module. An authentication module authenticates the user data from the user device locator module and generates an authentication signal. The user device locator module registers the port data at the user device locator module in response to the authentication signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
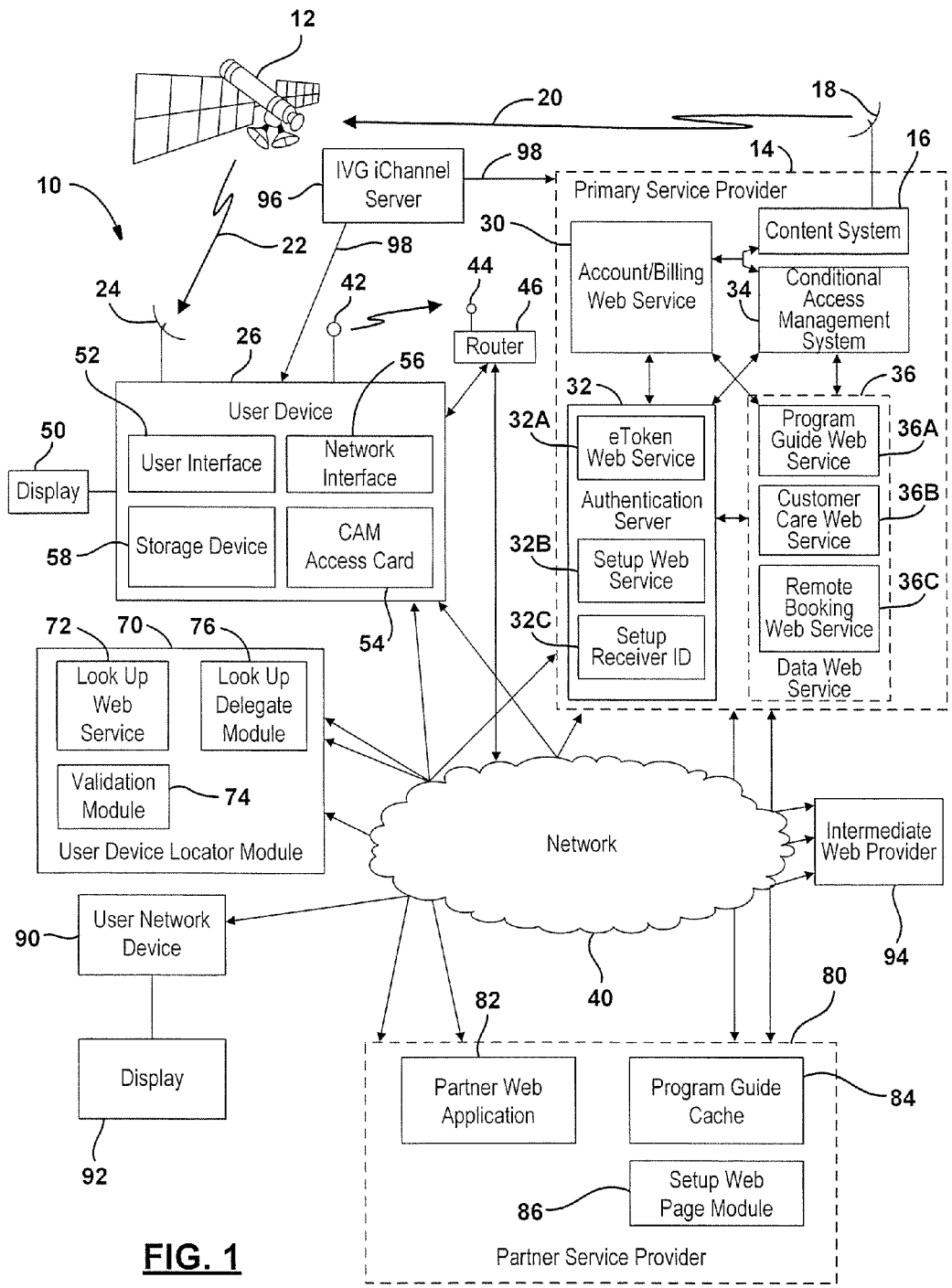
FIG. 1 is a block diagrammatic view of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The uplink signals 20 may be television signals and more specifically digital television signals. The uplink antenna 18 communicates the uplink signals 20 to the satellite 12 which in turn generates downlink signals 22. The downlink signals 22 are communicated to a receiving antenna 24 on a user receiving device 26. Although only one user receiving device 26 is illustrated, several user devices may be provided in the system 10. The user device 26 is primarily associated with and receives services from the primary service provider which may be in the form of signals or primary service data. As will be described below, a secondary or partner provider may also provide services (data et al.) to the user device. In the present example, the user receiving device may receive both television signals such as satellite television signals and data from the partner service provider (partner service data). For example, the partner service may be voicemail data. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user receiving device 26 may include a satellite television receiver, set top box or a digital video recorder. The satellite television receiver may also be referred to as an integrated receiver decoder. Of course, other types of user devices may be used such as a cable television set top box. Other types of user devices may include a mobile device such as a lap top computer, cellular phone, personal digital assistant, a portable media player or an automotive-based television receiving device. Thus, the user device may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

The primary service provider 14 may also include a conditional access management system 34. The conditional access management system 34 may be used to grant conditional access to various programming as well as provide recording commands to the user device 26 as will be described below.

The primary service provider 14 may also include a data web service 36. The data web service 36 may include a programming guide web service 36A, a key service or server 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40. The router 46 may also have a wired connection between the user device, the router 46, and the network 40. The router 46 may also be called an Internet Gateway Device (IGD) or simply a gateway.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

After the user device 26 is authenticated with the primary provider 14, the user device 26 may communicate with a user device locator module 70 through the network 40. The user device 26 may send the IP address of the user device, the port and the type of service offered on the ports to the user device locator module 70. Also, the user device encryption key may be provided from the user device 26 to the user device locator module 70. The user device locator module 70 may be a stand-alone device or it may be incorporated into the primary service provider 14. The user device locator module 70 may also be in communication with the authentication server 32.

The user device locator module 70 may include a look-up web service 72, a validation module 74 and a look-up delegate module 76.

The user device locator module 70 may be used to provide set top box port registration information from the user device. That is, the user device locator module 70 may include the IP address, port, service offered on the ports and the user device encryption key stored therein.

The primary service provider 14 may be in communication with a partner service provider 80. The partner service provider 80 may include a partner web application 82, a program guide cache 84, and a setup web page module 86. The partner web application 82 may generate various types of web content. For example, the partner web application 82 may generate a homepage-type display. The homepage display may receive information from the program guide cache 84 to fill a TV listing portion of the homepage display.

The setup web page module 86 may be used to setup various types of user network devices to communicate with the partner service provider 14 as will be described below.

The system may also include a user network device 90 that includes a display 92 associated therewith. The user network device 90 may be a web browsing device such as a portable computer, a personal digital assistant, a portable video player, an automotive-based user device, or the like. The user network device 90 may receive various data from the partner service provider 80 which may include a web page. The display 92 may be used for displaying various program guide information, along with other information provided by the partner service provider. The other information may include financial information, weather information, voicemail information, or other types of information. The partner service provider 80 may provide the content to be displayed on a website in various manners together with or in addition to the program guide information or other information.

An intermediate web provider 94 may also be included in the system. The intermediate web provider 94 may be used for communication between the primary service provider 14 and the user network device 90. The intermediate web provider 94 may be used to receive content or content clips from the primary service provider and store them therein. The user device 90 may obtain the content or content clips from the intermediate web provider 94 through the network 40 as will be further described below.

The intermediate web provider 94 may also communicate with the partner service provider 80. Rather than talking or communicating directly with the intermediate web provider 94, the user network device 90 may communicate with the partner service provider 80 and then to the intermediate web provider 94. This may allow another type of service to have access to the content on the intermediate web provider 94.

An interactive video guard (IVG) iChannel server 96 may be used to communicate between the user device 26 and the primary service provider 14. More specifically, the network interface 56 may be used to communicate between the IVG iChannel server 96 and a setup receiver identifier service module 32C. The IVG iChannel server 96 may be one of various types of connections. The IVG module is used as a secure connection between the user-receiving device 26 and the primary service provider 14. The secure connection is identified as reference numeral 98 in FIG. 1. It should be noted that the secure connection 98 may be part of the network 40. That is, the secure connection may be an HTTPS connection between the user device 26 and the primary service provider 14. The secure connection 98 may also be a public-switch telephone network connection. Thus, the network interface 56 may act as a modem or a broadband internet-type connection.

The setup receiver ID service 32C, which is disposed within the authentication server 32, is used for authenticating the user device 26. This will be described further below.

Figure 2:
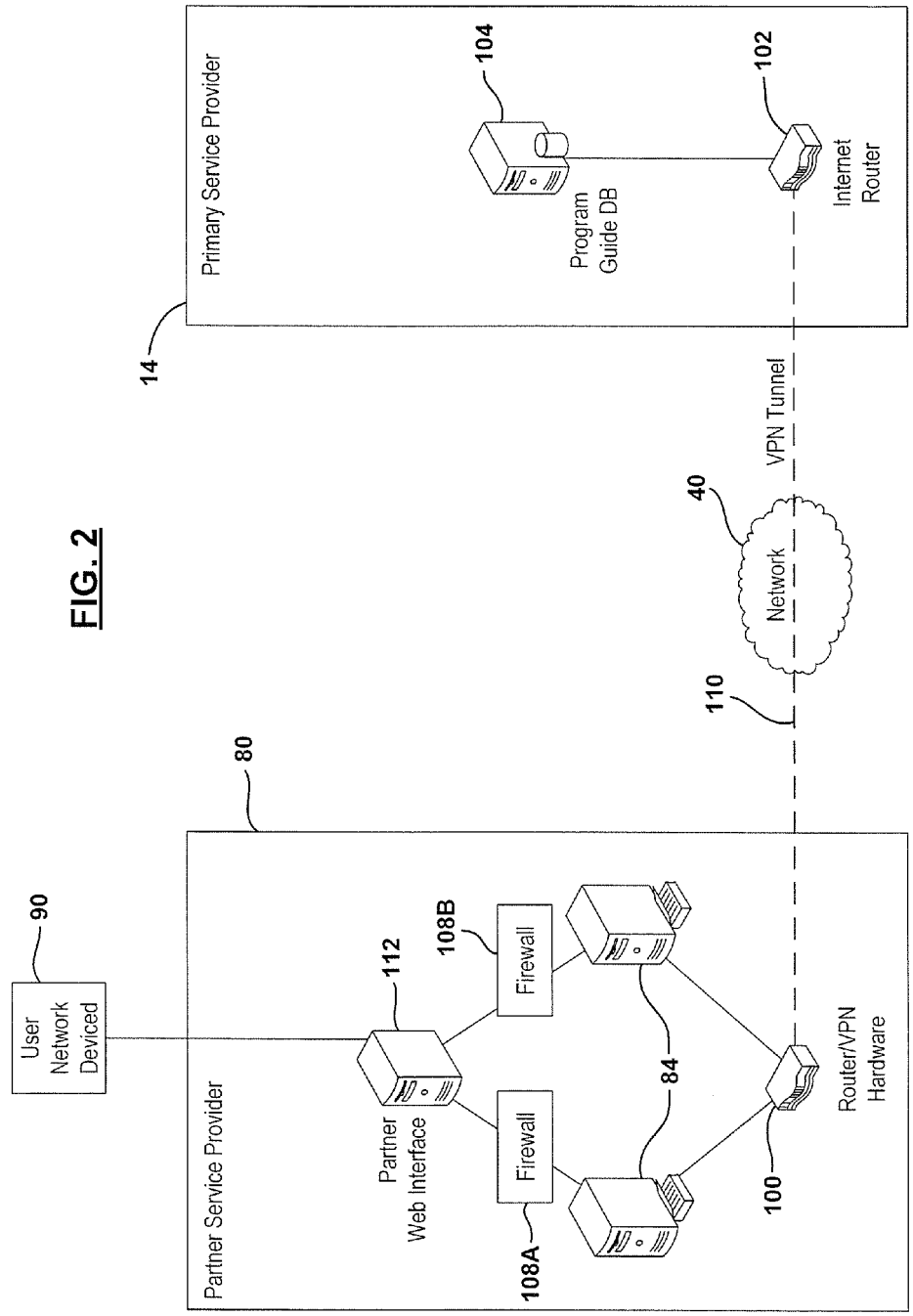
FIG. 2 is a block diagrammatic view illustrating further details of a partner service provider and the connection to a primary service provider.

Referring now to FIG. 2, a partner service provider 80 is illustrated in further detail. The partner service provider 80 may include a router or VPN hardware 100. The router 100 may communicate with a router 102 at the primary service provider 14. The program guide web service 36A of FIG. 1 may include a program guide database 104.

The partner service provider 80 may include the program guide cache 84 as set forth above. The cache 84 is illustrated in FIG. 2 as two devices. The program guide web service 36A described in FIG. 1 as being within the primary service provider 14, may also be provided within the partner service provider 80. The program guide web service and cache 84 may communicate with the user network device 90 through respective firewalls 108A and 108B.

The program guide data may be communicated from the program guide database 104 through the router 102 to the router 100 and stored within the program guide web service and cache 84. A virtual private network tunnel 110 may be established between the router 100 and router 102 for transferring the data therethrough. By providing the program web service and cache 84 at the partner service provider 80, delays due to network connections may be reduced since the user network device 90 will not have to wait for program guide data to be transferred through the network between the primary service provider 14 and the partner service provider 80.

The program guide web service and cache 84 may each be in parallel with a firewall 108A and 108B. The output of the program web service and cache 84 may be provided to the partner web interface 112. The partner web interface 112 may be used to direct program guide data to the user network device 90.

Figure 3:
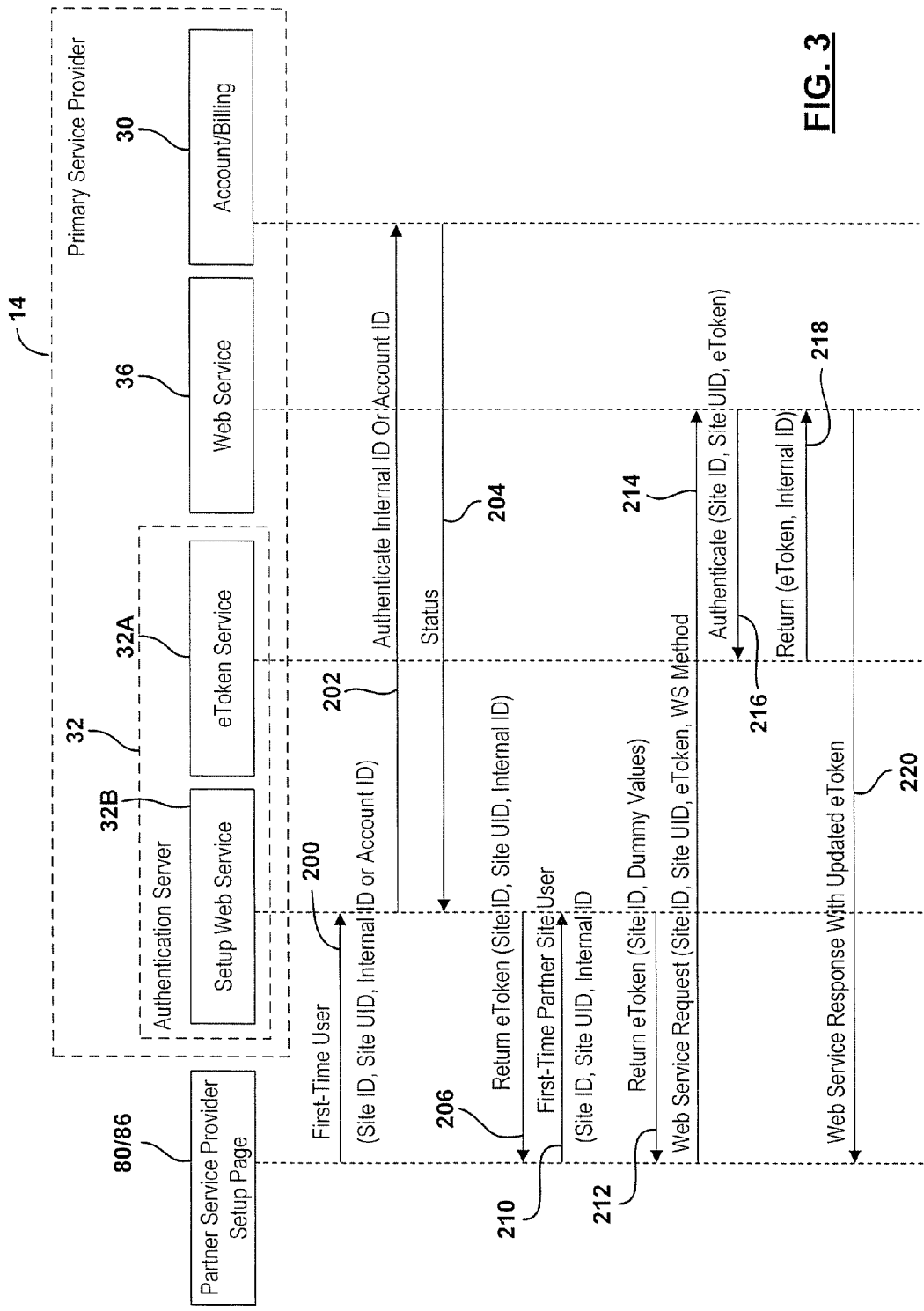
FIG. 3 is a flow diagram of a process for authentication between a partner service and a primary service provider.

Referring now to FIG. 3, a flow diagram having the setup page module 86, the authentication server 32 having the setup service 32B and the eToken service 32A, the data web service 36, and the account/billing web service 30 is illustrated. In step 200, a first-time user of the partner service web application may provide various identifying data to an account setup page. Thus, an account setup page may be initiated for a first-time user. Initiation of the setup page may also take place if the user requests data or requests an encrypted token from the data web service 36 for the first time. Identifiers prompted for entry at the setup page may include a site identifier which is the identifier of the partner service provider, a site user ID which is the partner's user ID. For example, the site ID may be the login identifier of the particular customer for the partner service provider. An internal identifier may also be provided, such as an account number that corresponds to the primary service provider account of the user. Other identifying information may include the customer's first name, last name, phone number and last bill amount provided by the primary service provider. The information mentioned above may be provided at a setup web page that identifies the user as a new user. The user network device 90 of FIG. 1 may be used to enter the information corresponding to the user. The site identifier may be provided by the particular partner service provider. The site identifier may be predetermined through an established arrangement with the primary service provider.

In step 200, after the user enters the various information into the setup web page, the information is communicated from the partner service provider, and, in particular, the setup web page to the setup web service 32B. The information may be communicated through the network 40 of FIG. 1.

In step 202, the account/billing web service 30 may receive the information at the primary service provider 14 through the network 40. The various information such as the internal identifier or account identifier may be provided to the account/billing service 30. The process may be first started by validating or authenticating the site identifier provided by the partner service provider. Thereafter, the internal account or ID may be authenticated.

In step 204, once the site identifier and the internal or account identifier are authenticated, a status signal is communicated to the setup web service 32B. The status may include a non-authenticated status.

If the status is positive, meaning the authentication has taken place, an encrypted token or eToken may be generated at the setup web service 32B in step 206. The eToken may be formed using various combinations of identifiers but may include a site identifier, a site user identifier, and a DIRECTV® internal identifier or account identifier. The eToken may also have an expiration date and/or time specified therein. The expiration date may have a current date time in which the eToken was formed and an elapsed time through which the eToken is valid. The elapsed time may be in seconds that are counted from the current time when the eToken is formed. Thus, the lifespan of the eToken is set forth. In subsequent authentication requests, if the expiration time is still valid, authentication may not be necessary. The eToken may be returned without modification if the eToken is still valid. If the expiration time has expired, re-authentication may be required and a new token may be generated with an updated expiration date and time.

In step 210, the partner service provider may also be used to obtain various data from the data web service 36 of the primary service provider 14. The partner service provider will thus not have individual customer or user information associated therewith. Therefore, the site identifier may be provided and dummy values or no values at all for the specific user information described above may be communicated to the setup web service 32B. If the site ID is a valid site ID as determined in the setup web service 32B, an eToken is generated using the site ID and dummy values if needed in step 212.

After the eTokens have been returned in steps 206 and 212, the web service or web application 82 in FIG. 1 of the partner service provider 80 may generate a web service request. The web service request may initiate from the user using the website from the partner service provider 80. The web service request may be a request for data. In addition, a web service request may initiate from the partner service provider itself so that various information may be received, such as program guide data. In step 214, the web service request is provided and may include the eToken, a site identifier, a site user identifier and a web service method. The web service request may be provided from the partner service provider and may be communicated to the data web service 36 of the primary service provider 14. Communication of the web service request may take place through the network 40.

In step 216, the information such as the site ID, the site user ID and the eToken may be communicated to the eToken web service 32A at the primary service provider 14. Authentication may decrypt the eToken and ensure that the site ID and the site user ID correspond with the site ID and the site user ID of the eToken. Authentication will be further described below. In step 218, the eToken and internal or account identifier may be returned once the authentication takes place in step 216. The return signal may return back to the web service 36. The web service 36 may then generate a web service response in step 220. The web service response may include an updated eToken if the eToken was expired and data from the web service 36.

Figure 4:
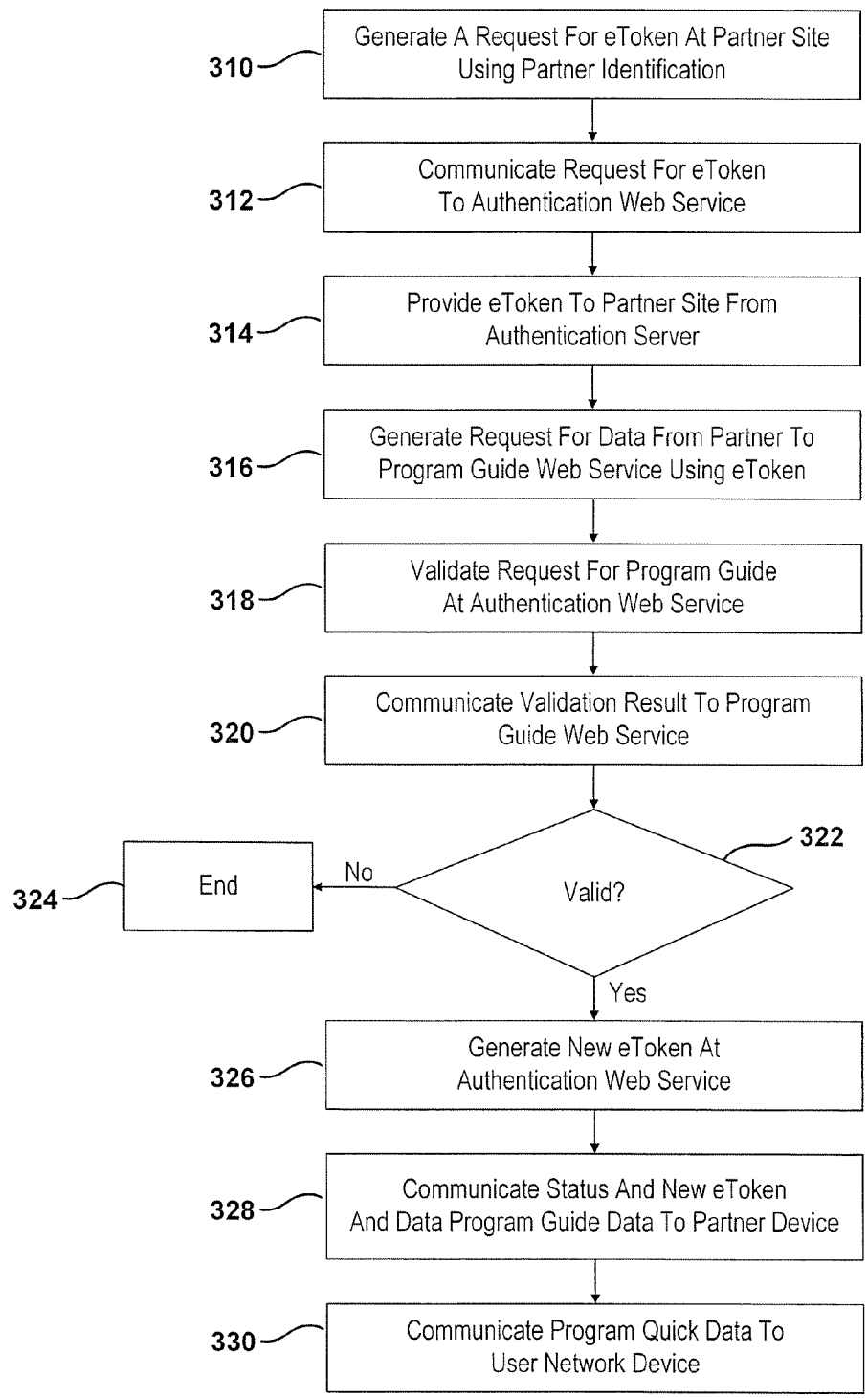
FIG. 4 is a flowchart of a method for establishing communication between a partner service provider and a primary service provider and requesting program guide data.

Referring now to FIG. 4, a method for establishing communication between a partner service provider and the primary service provider and requesting program guide data is set forth in more detail. The method also applies to non-program guide data requests as well. In step 310, a request for an eToken is generated at a partner site using partner identification such as the site identifier. Dummy values may also be used to replace expected variables corresponding to other types of formats and devices. In step 312, the request for an eToken is communicated to the authentication web service. In step 314, the eToken is generated and provided to the partner site from the authentication server. The generating and communicating of the eToken is performed in response to authenticating or validating the site ID or any other identifiers provided. In step 316, a request or data from the partner to the program guide web service is performed using the eToken. In step 318, the request for program guide data is validated at the authentication web service. In step 320, the validation results are provided to the program guide web service. In step 322, if the results indicate the request is not valid, then step 322 ends the process. If a valid request was generated in step 322, step 326 generates a new eToken at the authentication web service. The revising of the eToken may be an optional step and may be performed when an eToken has expired. However, a new eToken could be generated at each request.

In step 328, the status, the new eToken and the program guide data may be communicated to the partner device. In step 330, the various data as received from the data web service of the primary service provider may be communicated to the user network device.

Figure 5:
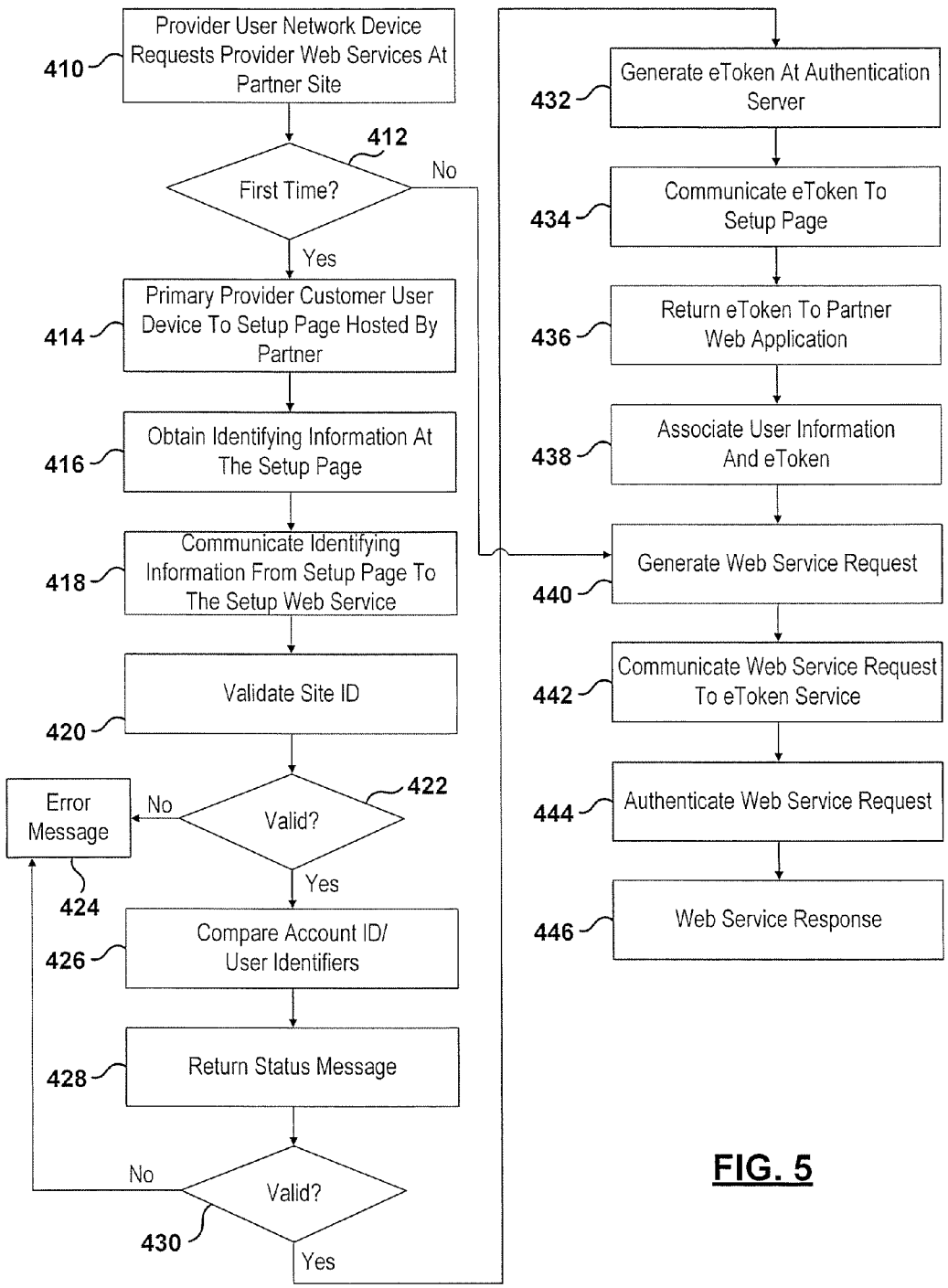
FIG. 5 is a flowchart of a method for configuring a user to communicate to the partner service provider and the primary service provider.

Referring now to FIG. 5, a method of configuring a user to communicate to the partner service provider and the primary service provider 14 is illustrated. In step 412, if the user is a first-time user, step 414 is performed. In step 414, the primary provider customer is directed to the setup page hosted by the partner. That is, the user device has setup information provided thereto. In step 416, information identifying the user is provided through the network user device. As mentioned above, this may include the name, address, telephone number, account or other type of identifier, or the like. In step 418, identifying information is provided from the setup page to the setup web service. That is, the information is communicated from the partner service provider to the primary service provider. In step 420, the site identifier is validated. In step 422, if the site identifier of the partner service provider is not valid, step 424 generates an error message. If the site is valid, step 426 compares the account ID and the user identifiers. In step 428, a status message is returned in response to the comparison performed in step 426. In step 430, if the information is not valid, an error message is generated in step 424. In step 430, if the user information is valid, step 432 generates an eToken at the authentication server 32 of the primary service device 14 of FIG. 1. In step 434, the eToken is communicated to the partner service provider 80. More specifically, the eToken may be provided to the setup page module 86.

In step 436, the partner web application and/or the setup web page module may receive the eToken. In step 438, the user information and the eToken are associated together. Thus, the user may only have to perform the setup web page service one time. Step 440 may be performed if step 412 indicates that the user has registered before. Also, step 440 is performed after step 438. In step 440, the web service request from the user network device 90 of FIG. 1 is generated. In step 442, the web service's request is communicated to the eToken web service 32A in the primary service provider 14 from the partner service provider 80. In step 444, the request is authenticated. In step 446, the web service responds by generating various data and communicating the data from the primary service provider 14 to the partner service provider 80 and ultimately to the user network device 90.

Figure 6:
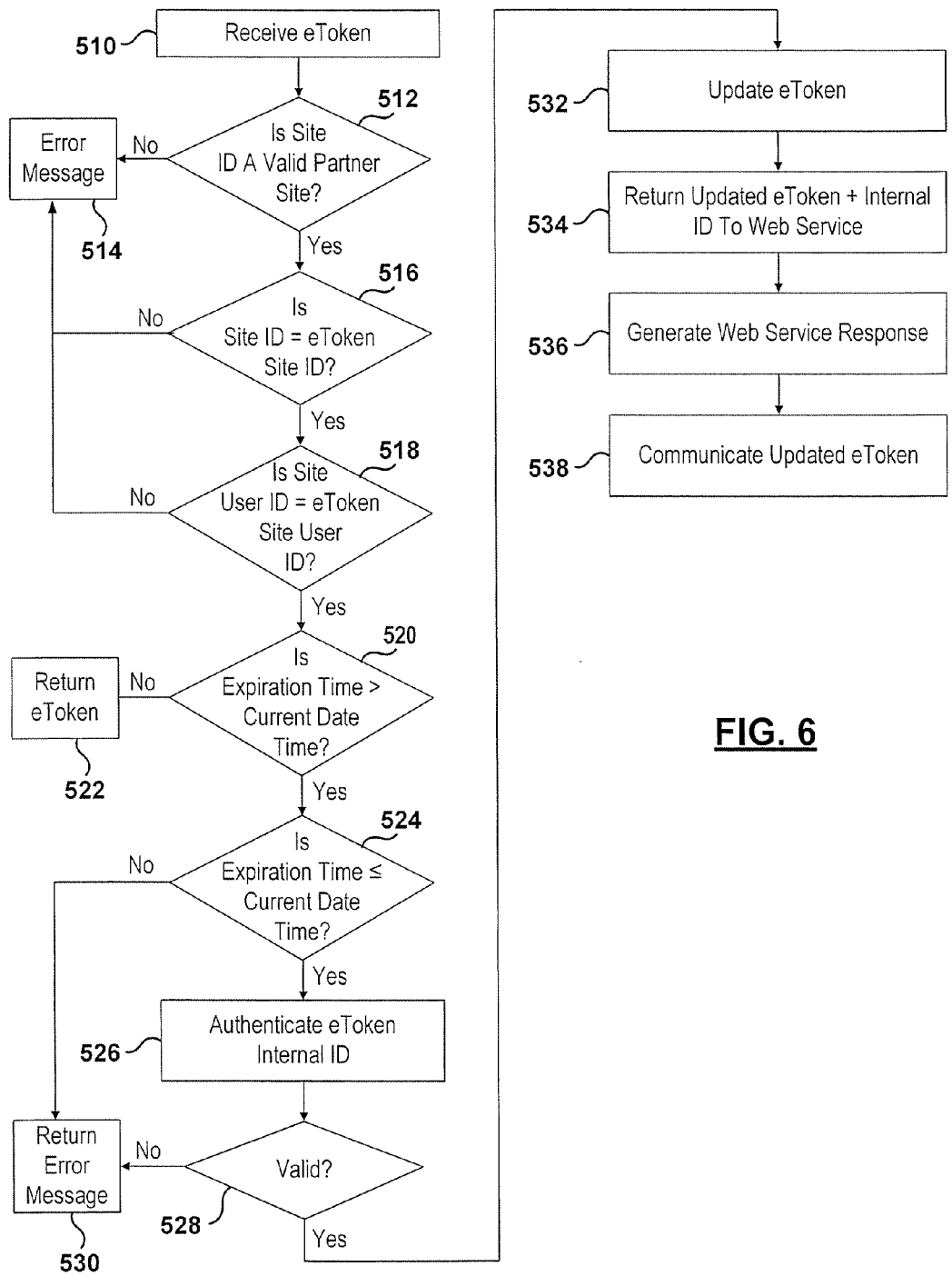
FIG. 6 is a flowchart of the authentication process described in FIG. 5.

Referring now to FIG. 6, the authentication process described briefly in step 444 of FIG. 5 is set forth in more detail. In step 510, an eToken is received at the eToken web service 32A. Ultimately, the eToken arrives from the partner service provider 80 through the network 40. The eToken may arrive through one of the data web services 36. In step 512, if the site ID of the partner service provider is not a valid partner site identifier, step 514 generates an error signal. In step 512, if the partner site is a valid partner site, step 516 is performed. The site ID is then compared to the site ID that was encrypted into the eToken. That is, the eToken is decrypted to determine the site ID formed therein. If the site ID is not equal to the site ID retrieved from the eToken, step 514 is again performed. If the site ID is equal to the site ID from the eToken, step 518 is performed. In step 518, the site user ID is compared to the site user ID from the decrypted eToken. If the site ID is not equal to the site ID it retrieved from the eToken, step 514 generates an error signal. In step 518, if the site ID is equal to the eToken site user ID, step 520 is performed. In step 520, if the expiration time is greater than the current time, the eToken is returned in step 522.

In step 520, if the expiration time is greater than the current date and time, step 524 is performed. In step 524, if the expiration time is less than or equal to the current date and time, step 526 is performed. Step 526 authenticates the eToken internal identifier. If the eToken internal identifier is not valid in step 528, an error message is returned in step 530.

If the eToken internal ID is valid, step 532 updates the eToken expiration time. In step 534, the updated eToken is returned and the internal ID is communicated to the web service. In step 536, a web service response is generated.

In step 538, the updated eToken is communicated to the partner service provider 80.

Figure 7:
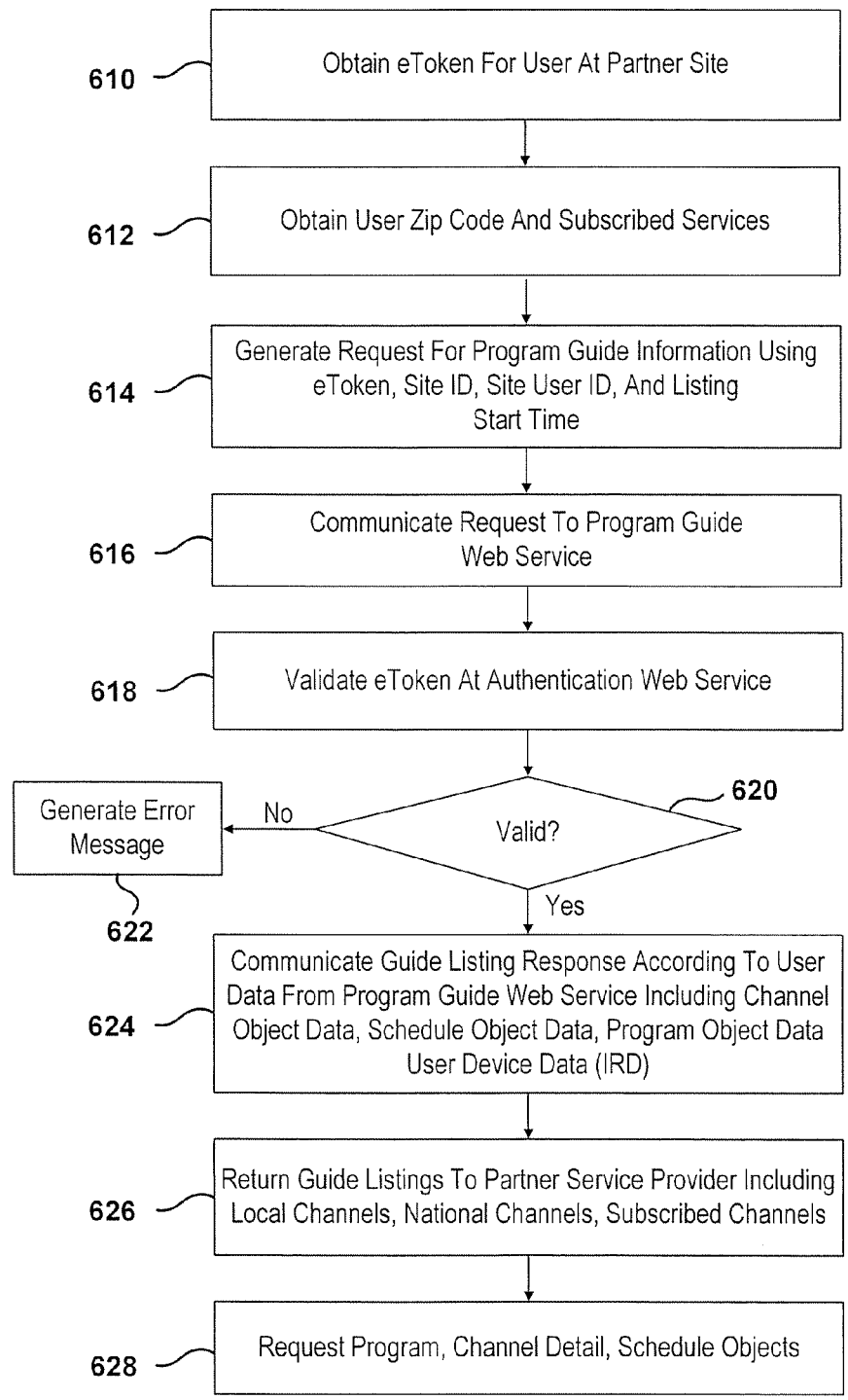
FIG. 7 is a method for requesting a linear program guide.

Referring now to FIG. 7, a method for requesting a linear program guide is performed. In step 610, an eToken for the user is obtained through the partner site. In step 612, additional data such as the zip code and subscribed services may also be retrieved. The additional data may be retrieved using the setup web page module 86. In step 614, a request for the programming guide using the eToken, the site identifier, the site user identifier and the site listing start time may be generated at the partner service provider. In step 616, the request and associated data may be communicated to the program guide web service 36A. In step 618, the eToken may then be communicated to the authentication server 32 where it is authenticated. If the eToken is not valid, an error message is generated in step 622. In step 620, if the eToken is valid, step 624 communicates a guide listing response according to the user from the programming guide web service. That is, specific subscription data may be obtained from the account billing web service 30 to inform the program guide web service 36 as to the subscriptions and location of the user network device. The program guide in step 624 may return channel object data, schedule object data, program object data and user device data which correspond[s] to information regarding the integrated receiver decoder or set top box. The data may be used to provide a program guide to the user network device 90.

The channel object data may include the primary visible content channels valid between the listing start date and the end date. The channel data may include channels provided by the primary service provider as well as turnaround channels provided by the primary service provider. The channel object may comprise various information such as a channel key which is a unique key made up of the content channel identifier and the channel start time that identifies the channel instance. The content channel identifier specifies the identifier for the content channel. The channel start time and channel end time specify the starting and ending time that the channel is valid. Certain channels may be valid indefinitely and some channels may be valid only for a predetermined amount of time. The channel object may also include a channel object identifier. This specifies the content key in the provider system that maps to the content channel identifier. A major channel number and minor channel number may also be used as an identifier. A market identifier corresponding to a designated marketing area corresponding to the Nielsen® geographic data may also be set forth. National broadcast channels may not specify a market identifier. A source identifier may also be provided for the channel. For example, various sources for the channel identifier may be provided including Tribune Media Services. The station ID may also be provided in the channel object. A short name and long name corresponding to the call letters or the channel may be provided. A description, category, service type, codec type, network affiliation, channel logo ID and authorization code may also be provided. The authorization code may correspond to fully subscribed, partially subscribed, not subscribed or not applicable. The authorization code may allow users to view information if the information has been subscribed to.

Schedule data may also be provided which includes the air time for a particular program, the duration that includes the length of time that the program will air, an authorization code similar to those described above including subscribed, not subscribed and not applicable, and a blackout code to determine if the content may be blacked out.

Program data may also be provided. Program data may use a program reference identifier that is used to uniquely identify the program record and its contents. The program title, the episode title or the sports team's name may also be provided. A theatrical release year, original air date, a description describing the program content may also be provided. A secondary identifier such as a tribune media services identifier may also be provided in the program data. A category, label such as a category or genre may also be provided. The relevance of the category label may also be categorized. An in-guide flag may also be provided which indicates whether or not the label should appear with the program description on the screen. A credit, contribution, last name, first name, source type and network/syndicater-type may also be provided. Indicators may also be provided as to whether the program is in color, provides a secondary audio program, whether the program is a repeat, a premiere or a finale and whether the program is live, taped or taped delay. Other information may include whether the content is subtitled, letterboxed and the ratings of the particular content. An advisory may also be provided in the program data. An advisory may correspond to motion picture advisories. A television advisory may also be provided for television content that includes TVY7, TVPG, TV14, TVMA. A close-captioning indicator, a high definition indicator, an AC3 audio content indicator, a Dolby surround sound indicator, pay-per-view data, an all-day ticket data or a descriptive video service data may also be provided.

IRD data or set top box data may also be returned to the partner service provider. This information may be used to schedule a recording from the user network device. The partner service provider may use the IRD or user device information to target specific IRDs corresponding to the subscriber's account. The IRD or user device information may include a receiver ID that identifies the partner service receivers. The access card identifier may also be provided. The model number of the user device, the manufacturer of the user device and the location within the customer's premises may also be provided. The various numbers of receiving devices or user devices may be provided with a customer account. Therefore, a specific user device may be specified. The receiving device data may also include a remote booking allowed flag. This flag may indicate whether or not remote booking is allowed.

In step 626, the guide listings are returned that include the local channels, national channels and subscribed channels and the various data described above. In step 628, a program may be requested using the channel detail, the program detail and the user device data.

Figure 8:
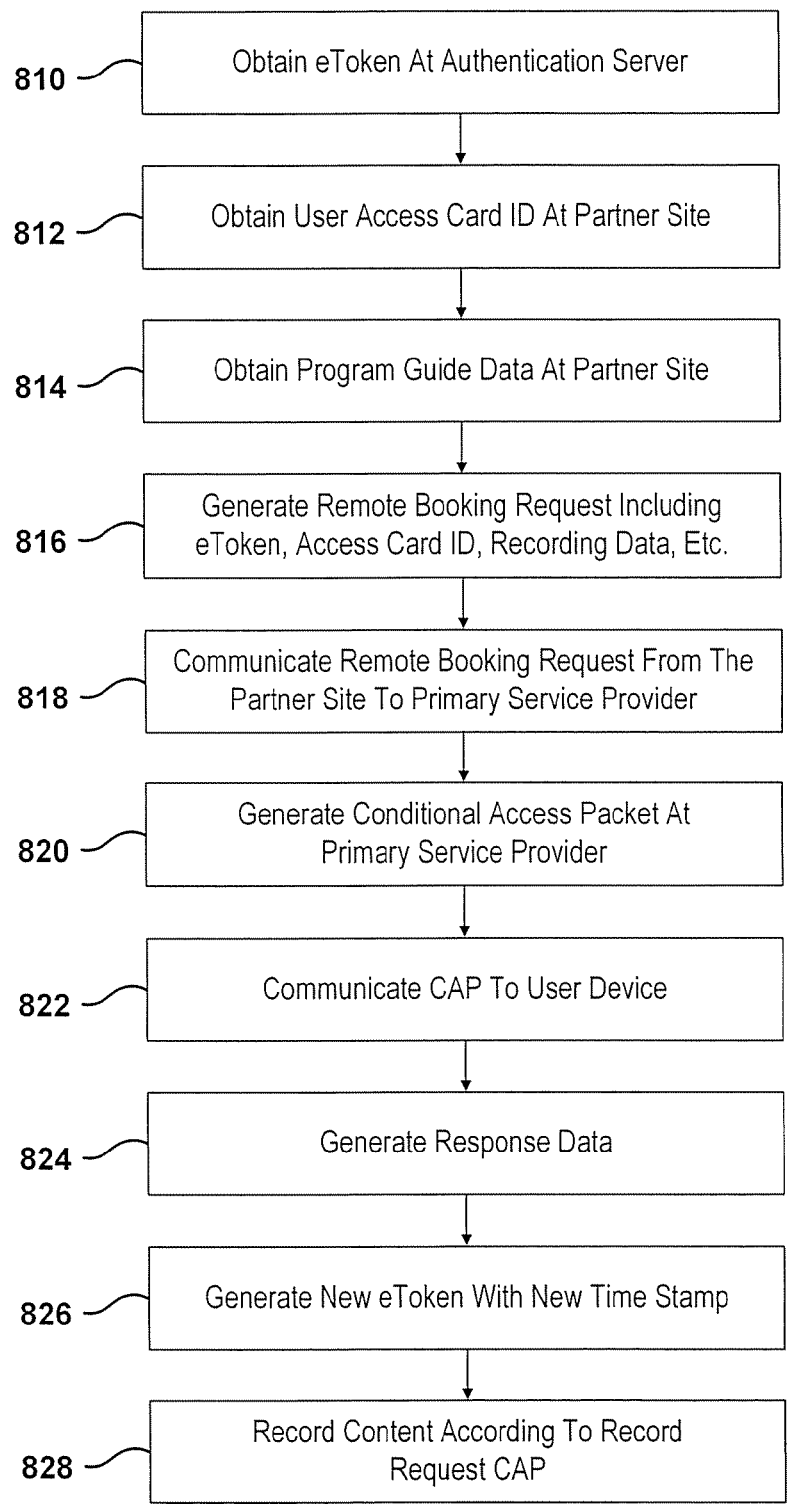
FIG. 8 is a flowchart of a method for remote booking from a user device.

Referring now to FIG. 8, a detailed method for remote booking is set forth. Remote booking is used to allow the user network device to request the storage device of the user device to store a broadcast program or content. In step 810, an eToken is received at the partner site from the primary service provider, and, more particularly, eToken web service 32A of FIG. 1. In step 812, the user access card ID is obtained at the partner site. This may be obtained when a request for program guide data or other data is provided as mentioned above. In step 814, the program guide data is also received at the partner site. As mentioned above, various types of channel data, object data, program data and receiver device data may be obtained. In step 816, remote booking requests, including eToken, access card identifier and recording data may be generated. In step 818, the remote booking request may be communicated from the partner site to the primary provider. In step 820, a conditional access packet may be generated at the primary service provider.

In step 822, the conditional access packet may be communicated to the user device. The conditional access packet may be a recording instruction for a particular program at a particular time on a particular channel. In step 824, a response data may be generated from the primary service provider to the partner service provider. The response data may include a successful transmission of a conditional access packet to indicate that the user device may record the information within the storage device 58. After step 824, a new eToken with a new timestamp may be provided from the primary service provider and, in particular, the eToken web service 32A with a new timestamp. As mentioned above, a new timestamp may be provided if the previous timestamp has expired.

In step 828, the content may be recorded according to the recording request or conditional access packet as described above. The content is then able to be used and/or played back at the convenience of the user of the user device.

Figure 9:
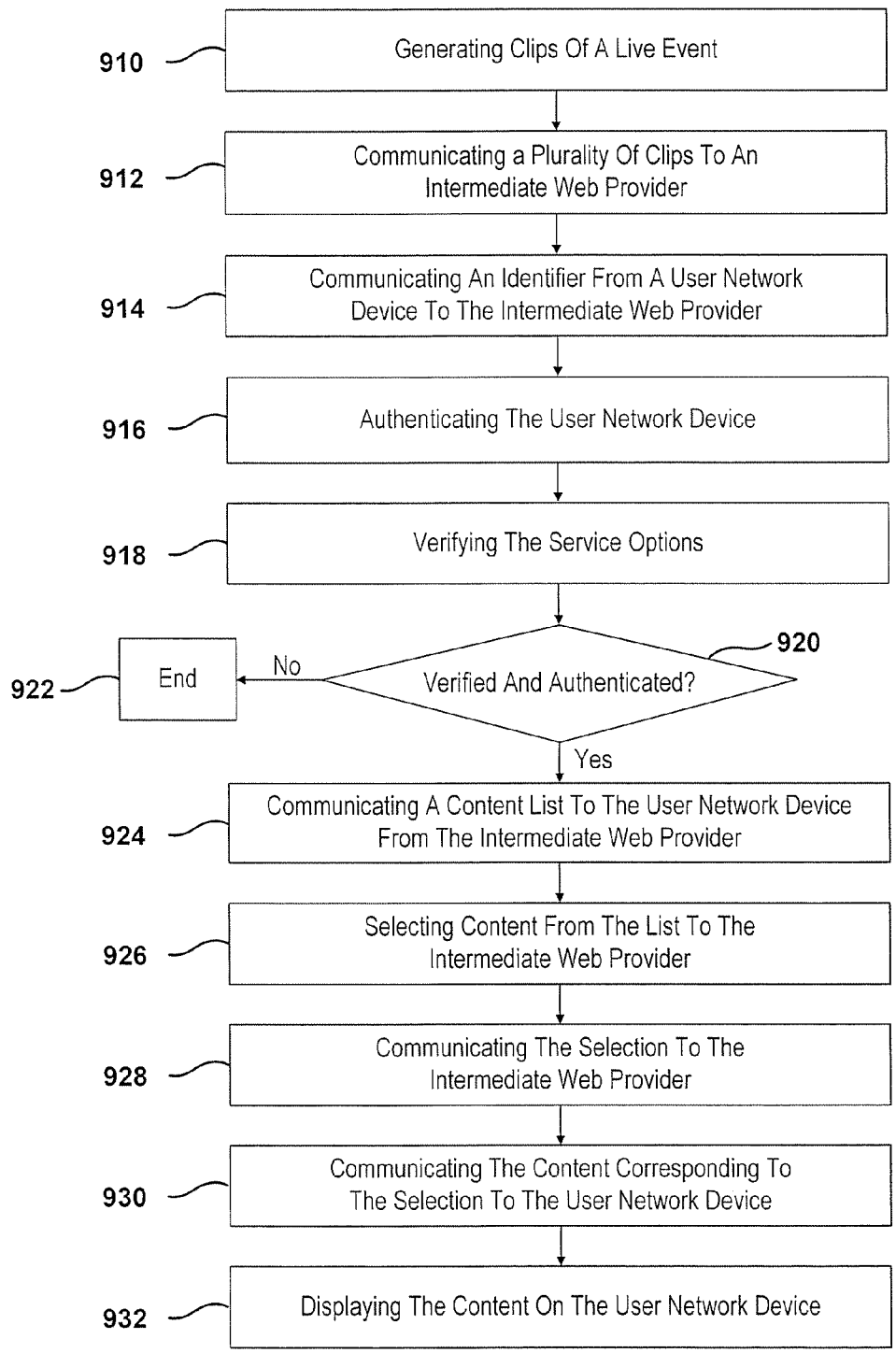
FIG. 9 is a flowchart of a method for providing content to a user network device.

Referring now to FIG. 9, a method for reviewing content such as recorded clips of live events is set forth. In this example, the clips may be recorded or saved from a live event such as a football game or other event. The clips may be highlights of important events and thus may be only a small portion of a particular event. In step 910, clips of a live event are generated. The live event clips may be generated in the primary service provider or may be generated elsewhere and communicated to the primary service provider.

In step 912, a plurality of clips is communicated to an intermediate web provider. The clips may be provided to the intermediate web provider in response to a query from the intermediate web provider if more current clips are available. The clips may also automatically be provided to the intermediate web provider.

In step 914, an identifier from a user network device is communicated to the intermediate web provider. The user network device may communicate various identifier-type information including an account number or other type of login and/or password. In step 916, the user device is authenticated. The user device may be authenticated at the intermediate web provider, or the identifier data may be communicated to the primary service provider. In step 916, the network device is authenticated. In step 918, the service options to receive the content may be determined. For football clips, for example, the user may be required to subscribe to a Sunday football package. Both the authenticating and the verifying may take place either at the intermediate web provider or at the primary service provider. Both the authentication and verification may take place at the same time.

In step 920, if the user network device is not verified or authenticated, step 922 ends the process. In step 920, if the user network device has been verified and authenticated, step 924 communicates a content list to the user network device from the intermediate web provider. The content list may include a list of a number of the most recent NFL clips, in carrying forward with the example set forth above. For example, a list of five may be provided.

In step 926, content may be selected from the list to form a selection at the user network device. In step 928, the selection is communicated to the intermediate web provider. In step 930, the content corresponding to the selection is communicated to the user network device.

In step 932, the content may be displayed on the user network device. That is, the content video may be played back through the user network device. As mentioned above, the user network device may be various types of devices, including a mobile phone or other type of web-enabled device. It should be noted that the content list in FIG. 9 may be continually updated and thus the content list may be continually provided to the user network devices.

Figure 10:
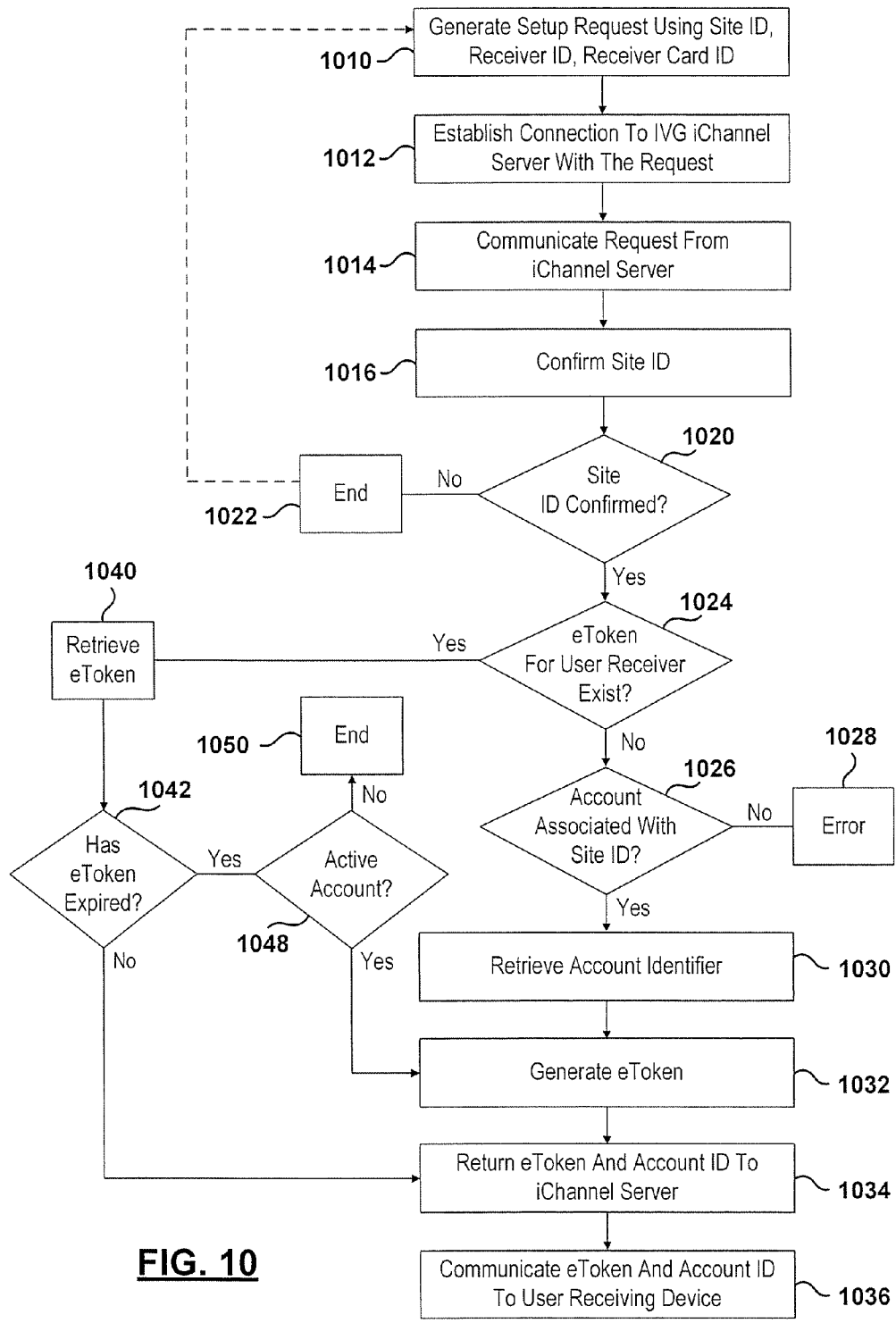
FIG. 10 is a flowchart of a method for establishing a user receiving device into the system.

Referring now to FIGS. 1 and 10, a method for authenticating a user-receiving device such as a satellite set top box receiving device 26 is set forth. In step 1010, the receiving device generates a setup request using a site ID, a receiver ID and a receiver card ID. The site ID is the site identifier for the particular DIRECTV® partner. This may be a numeric identifier, alphanumeric identifier or alphabetic identifier. The receiver identifier may also be referred to as a site user identifier. The user ID may be the serial number of the particular receiver within the home associated with a particular account. The receiver card ID is the identification number associated with the particular conditional access module or access card.

In step 1012, a connection to the primary service provider 14 is requested. The request may be a request to setup or establish a connection. An interactive video guard connection may be established so that the connection is secure. First, step 1012 establishes a connection with an IVG iChannel server 96 of FIG. 1. The IVG iChannel server 96 may also be located within the primary service provider 14. As illustrated, the IVG iChannel server 96 is a standalone device. Also, the secure connection 98 between the IVG iChannel server 96 and the user device 26 and the IVG iChannel server 96 and the primary service provider 14 may be established through a secure connection through the network 40.

In step 1014, the request is communicated from the IVG iChannel server 96 to the primary service provider 14. The site identifier may be confirmed in step 1016. The site identifier may be confirmed by determining if the number or identifier is a valid identifier. In step 1020, if the site identifier is not confirmed, the system ends in step 1022. An error message may be sent to the user receiving device that authentication is not possible. Further, the system may ask for re-entry of certain information or start the process again at step 1010.

If the site identifier has been confirmed, step 1024 is performed. In step 1024, it is determined whether an eToken for the user receiving device exists. If an eToken does not exist for the user receiving device, step 1026 determines whether there is an account associated with the site identifier. If there is not an account with the site identifier, step 1028 is performed in which an error signal or error flag may be generated. If there is an account associated with the account identifier in step 1030, the account identifier is retrieved. The account identifier may be the account number associated with the particular user.

In step 1032, an eToken is generated. The eToken is generated by encrypting various data into the binary-encrypted token. The site ID, the user receiving device ID, the account identifier obtained in step 1030 and an internal DIRECTV®-registered user identifier may also be encrypted into the eToken. However, not all of the above-mentioned components may be placed into the encrypted token. Further, an expiration date and/or time may be provided in the encrypted token. This time value defines the lifespan of the authentication of the eToken. If the expiration time has expired, an expired eToken message may be returned. In step 1034, the eToken is returned and the account identifier is returned to the iChannel server. In step 1036, the eToken and the account identifier are communicated to the user receiving device from the iChannel server.

Referring back to step 1024, if the eToken for the user identifier does exist, the eToken is retrieved in step 1040. After step 1040, step 1042 determines whether the eToken has expired. If the eToken has not expired, the system continues in step 1034 where the eToken is returned.

Referring back to step 1042, if the eToken has expired, the system determines whether an active account is still associated with the eToken. If an active account is not associated with the eToken, step 1050 ends the process. If an active account is associated with the eToken, an eToken is generated in step 1032. Thereafter, steps 1034 and 1036 are provided which communicate the eToken back to the user receiving device 26.

Figure 11:
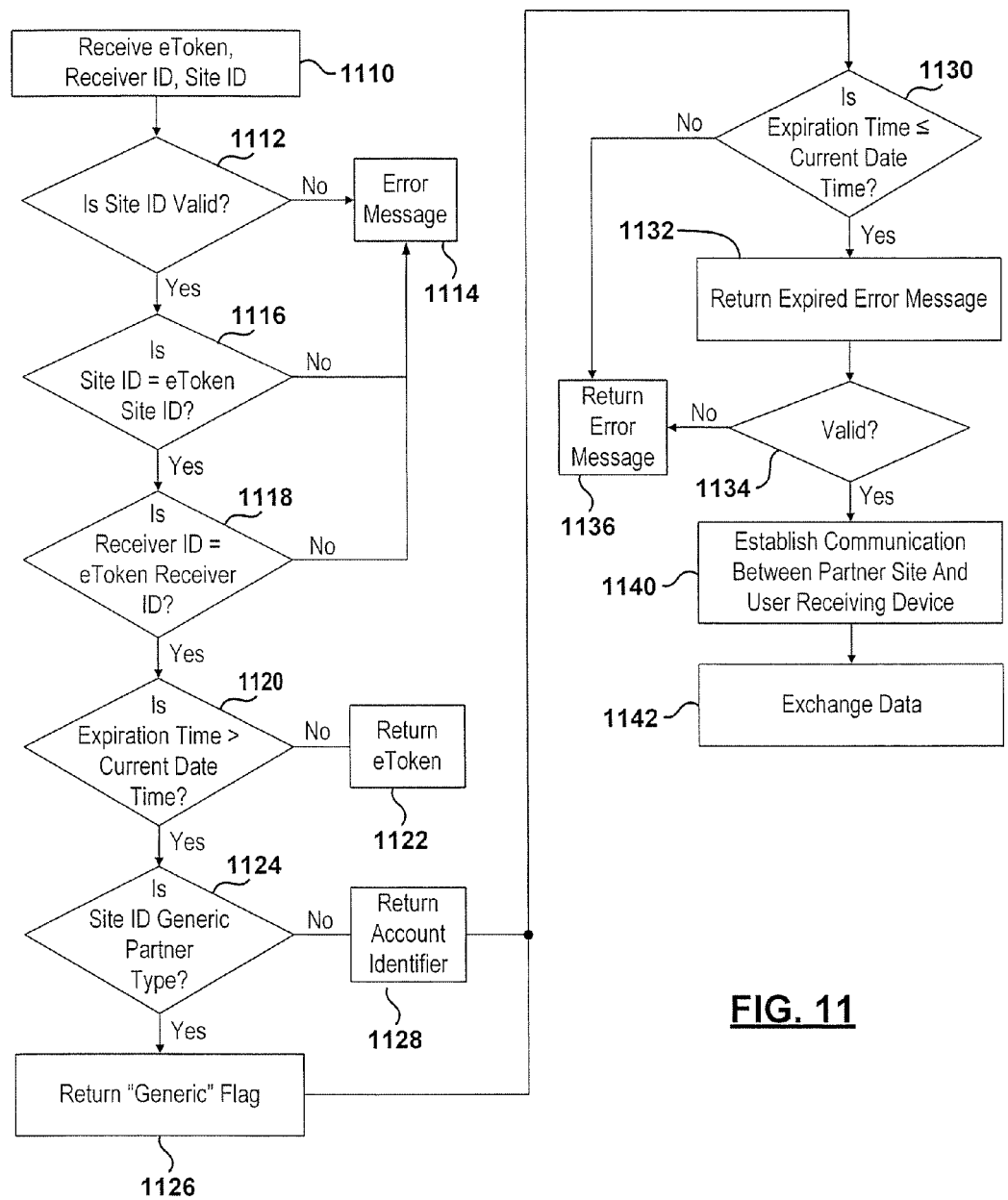
FIG. 11 is a flowchart of a method for communicating between a user receiving device and a partner service provider.

Referring now to FIG. 11, once the eToken has been provided to the user receiving device, the user receiving device is ready to communicate with the partner service provider 80 of FIG. 1. Various types of data may be exchanged between the partner service provider 80 and the user device 26. It is likely that the bulk of the data will be providing a service from the partner service provider 80 to the user device 26. For example, the partner service provider 80 may be a telecom provider providing voicemail or other types of data service that may be used in conjunction with the display 50 associated with the user device 26 of FIG. 1. In step 110, the eToken is received at the partner service provider 80.

A request for data, a request to communicate or other type of communication is initiated at the user receiving device. Ultimately, the eToken arrives through the network 40 in addition to other data. In step 1112, if the site ID of the user device is not valid, step 1114 generates an error message signal. In step 1112, if the site ID is a valid site ID, step 1116 is performed. The site ID is then compared to the site ID that was encrypted into the eToken in step 1116. That is, the eToken is decrypted to determine the site ID formed therein. If the site ID is not equal to the site ID retrieved from the eToken, step 1114 is again performed. If the site ID is equal to the site ID from the eToken, step 1118 is performed. In step 1118, the receiver ID is compared to the receiver ID from the decrypted eToken. If the site ID is not equal to the site ID it is retrieved from the eToken, step 1114 generates an error signal. In step 1118, if the site ID is equal to the eToken site user ID, step 1120 is performed. In step 1120, if the expiration time is greater than the current time, the eToken is returned in step 1122.

In step 1120, if the expiration time is greater than the current date and time, step 1124 is performed. In step 1124, it is determined whether the site ID is a generic partner type or a specific partner type. If the ID is a generic type, a generic flag is returned in step 1126. In step 1124, if the site ID is not a generic type, meaning a specific user, step 118 returns an account identifier.

In step 1130, if the expiration time is less than or equal to the current date and time, step 1132 is performed. In step 1132, an expired error message is returned.

After step 1132, step 1134 determines whether or not the eToken is valid. If the eToken is not valid, step 1136 returns an error message. In step 1134, if the eToken is valid, step 1140 establishes communication between the partner site and the user receiving device. In step 1142, data may then be exchanged between the two devices. That is, the set top box or user receiving device may directly exchange data with the partner service provider. As mentioned above, various services, such as telecom services, may be provided. One example is that voicemail may then be communicated to the user device 26 by using the user interface 52 and display 50 as illustrated in FIG. 1.

Figure 12:
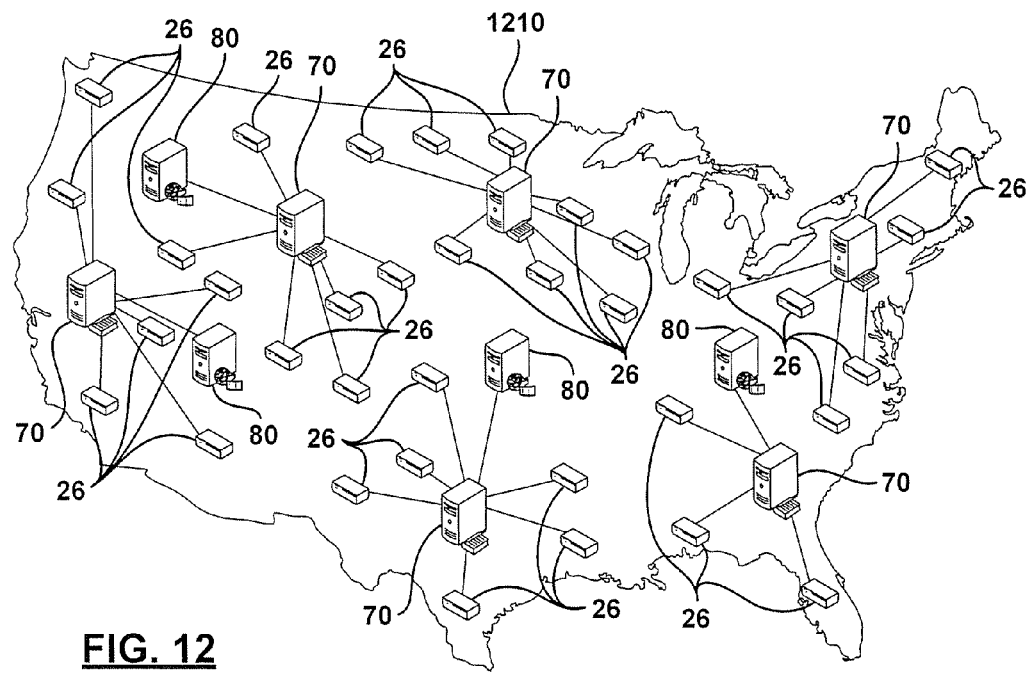
FIG. 12 is a layout view of a system having distributed user device locator modules in communication with various partners and user receiving devices.

Referring now to FIG. 12, a map 1210 of the Continental United States is illustrated. The map 1210 represents a geographical area having a plurality of locator modules 70. A plurality of locator modules 70 may be used to distribute the load across the geographic area. However, as illustrated in FIG. 1, only one locator module 70 may be used. Each locator module 70 may be located in a particular region of the geographic area. A plurality of user devices 26 may be associated with each locator module 70. That is, when a connection is desired between a user receiving device 26 and the locator module 70, the locator module 70 closest to the user receiving device 26 may be chosen for communicating. An alternative one or several user locator modules 70 may also be tried in the case of a slow connection or no connection between the user receiving device 26 and the locator module 70.

Various partner service providers 80 may also be in communication with the user device locator module 70. Various numbers of partner service providers 80 may be provided throughout the geographic area. As illustrated, four partner service providers 80 are illustrated each in communication with a different user device locator module 70.

Figure 13:
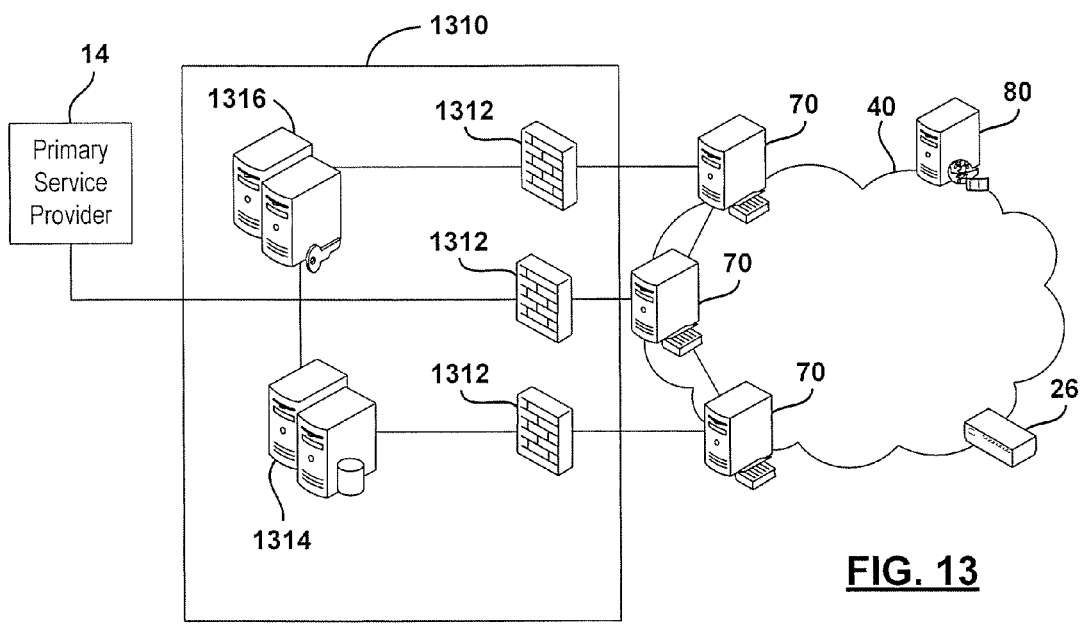
FIG. 13 is a high-level schematic view of a portion of the system illustrated in FIG. 12.

Referring now to FIG. 13, only one partner 80 and only one user device 26 is illustrated in communication with three user device locator modules 70 through the network 40 for simplicity. As illustrated in FIG. 12, various numbers of partners 80 and various numbers of user devices 26 may be interconnected. The locator modules 70 may be connected to an internal network 1310. The internal network 1310 may be private. The internal network 1310 may be part of, but isolated from, other portions of the locator module 70 by firewalls 1312. The network 1310 may include an account database 1314 and a key server or service 1316. Firewalls 1312 may set up a demilitarized zone (DMZ) to prevent unauthorized access from the Internet into the partner private network 1310. The locator modules 70 may be servers that have an outfacing public IP address connected to the Internet or the network 40 to provide user device registration, look-up service and a key retrieval service. The firewalls 1312 may thus prevent unauthorized access to the account database 1314 and the key server or service 1316. The key server 1316 and the account database 1314 may have an internal non-public IP address sub-net that may be used to exchange information between the server 70 and the internal databases. The locator modules 70 may be located in remote uplink facilities used to collect local channels and uplink them to the satellite 12. The locator module 70 may have the internal private network in communication with the primary service provider 14 and in particular the authentication server therein. The authentication server 32 may be used to verify or authenticate requests by verifying or authenticating the eTokens therein.

Referring to both FIGS. 12 and 13, the user receiving devices 26 may be provided with a listing of all the locator modules 70 as well as their IP addresses. The locator module 70 with the closest geographic location may be chosen by the user receiving device 26. However, the option of trying various other locator modules 70 may be provided. By geographically distributing the locator modules 70, application performance and load spread may be improved.

Figure 14:
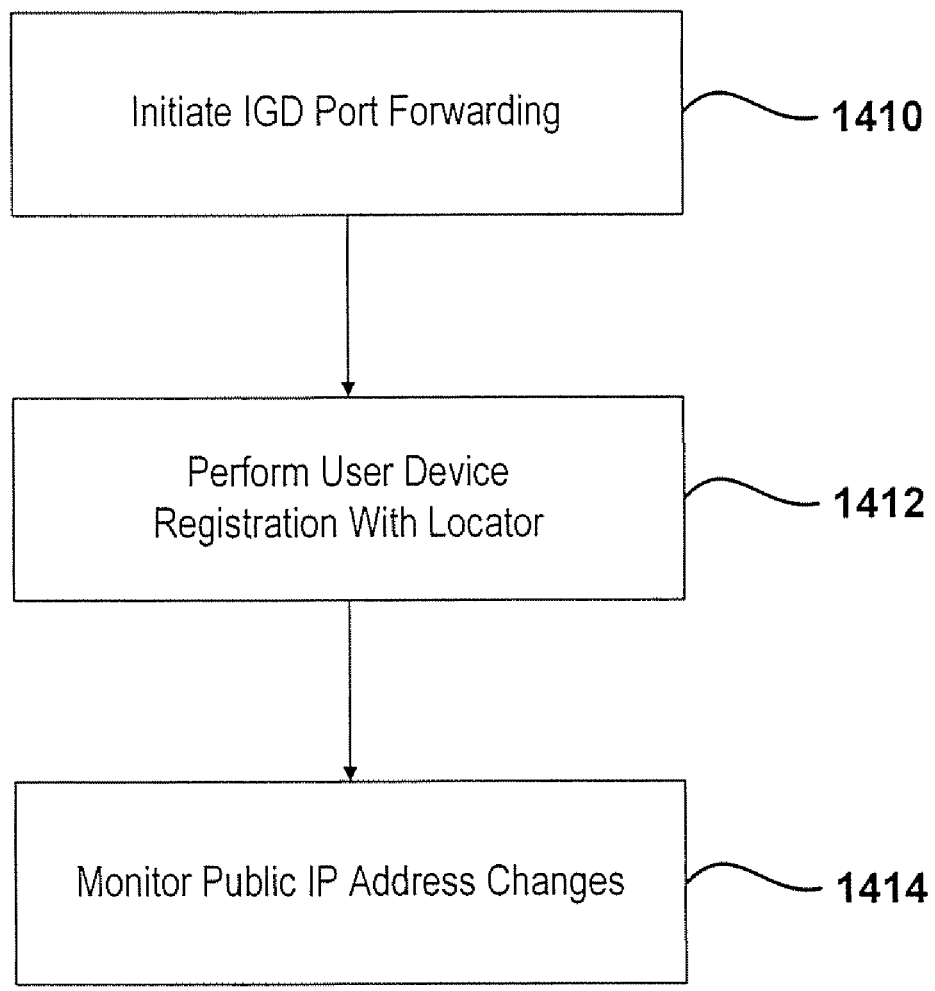
FIG. 14 is a flowchart of a method for communicating between a partner and a user receiving device.

Referring now to FIG. 14, a method for registering data with the locator module 70 is illustrated. There are three main steps in the process. The first two of the three steps will be described in FIGS. 15 and 16 in further detail. The first step is FIG. 1410 in which the determination of a communication port is performed by initiating an Internet Gateway Device (IGD) port forwarding sequence. After port forwarding is performed, step 1412 the user device registers with the locator module 70. Thereafter, step 1414 monitors for public IP address changes.

Figure 15:
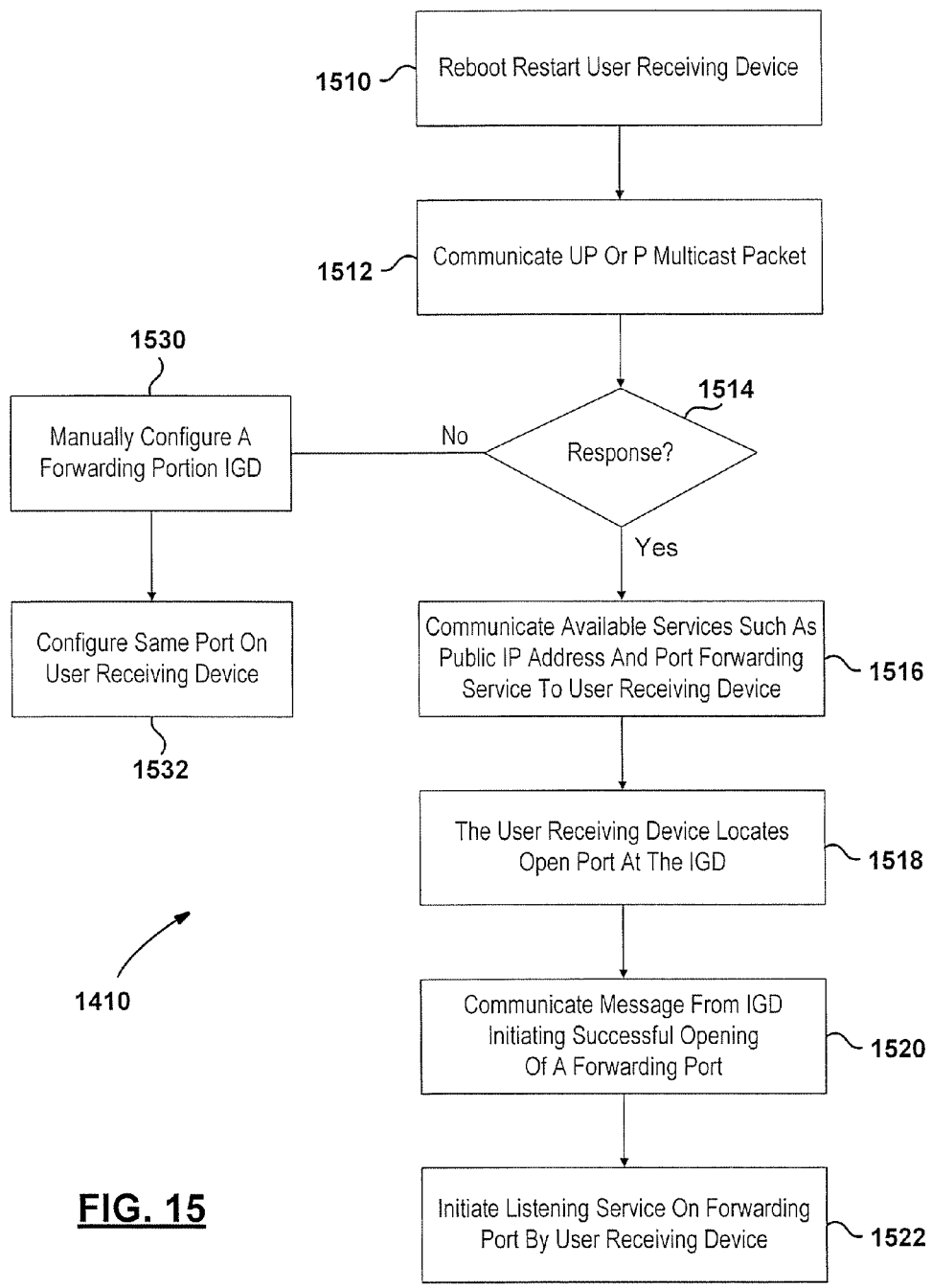
FIG. 15 is a flowchart of the method for initiating a gateway device port forwarding as set forth in FIG. 14.

Referring now to FIG. 15, step 1410 is illustrated in further detail. In step 1510, the process starts when the user receiving device is rebooted or restarted. As mentioned above, the user receiving device may be a television receiving device such as a satellite television receiving device. In step 1512, the user receiving device will attempt to locate the Internet Gateway Device (IGD) such as a home router or gateway (46 of FIG. 1). The user receiving device will determine whether the router of FIG. 1 is universal plug and play (UPnP) capable. A UPnP multicast packet is generated at the user receiving device and transmitted to the router or IGD 46. In step 1514, if a response is generated by the IGD, the IGD is UPnP compatible and step 1516 is performed.

In step 1516, the available services are communicated to the user receiving device. The available services may include a public IP address, a port forwarding service, or the like.

In step 1518, the user receiving device locates an open port. This may be performed if the gateway or router device lists port forwarding as one of the available services. The user receiving device may attempt to locate an open port on the gateway device either through a port scan or arbitrarily picking an open port and configuring the gateway device by performing a port forwarding command as specified in the UPnP protocol. In step 1520, when an open port has been successfully determined, the gateway device notifies or communicates a message indicating the port has been open to accept incoming connections.

In step 1522, once a port has been chosen, the user receiving device starts a listening service on the forwarding port.

Referring back to step 1514, if a response has not been received, the gateway or router 46 may not be universal pug and play compatible. In step 1530, a manual configuration of a forwarding port on the Internet Gateway Device, such as the router, may be performed. In step 1532, the same port used as the forwarding port in step 1530 may be configured on the user receiving device.

Once configured, the port may be used to communicate partner service data to the user receiving device and communicate signals from the user receiving device. The partner service data may be received in addition to primary service data or signals.

Figure 16:
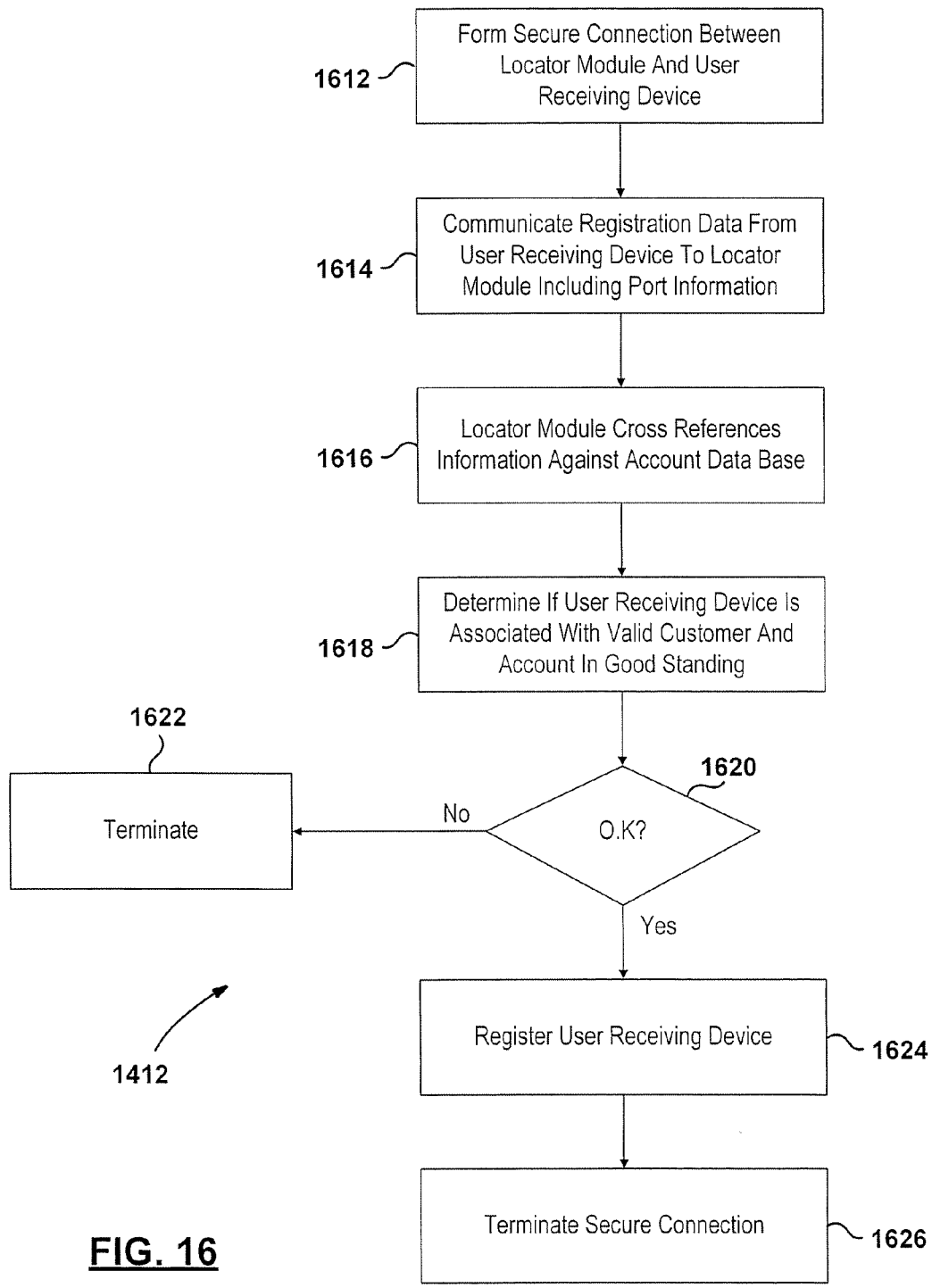
FIG. 16 is a method for registering a user device with a locator module as set forth in FIG. 14.

Referring now to FIG. 16, step 1412 of FIG. 14 is illustrated in further detail. In step 1612, a secure connection between the locator module 70 and the user receiving device through the gateway device is performed. This may be a secure sockets layer (SSL) type connection. In step 1614, registration data may be communicated from the user receiving device to the locator module that includes port information. The data provided from the user receiving device may include user device data including a site identifier that identifies the user device as an individual user device rather than a partner service provider. A site user identifier, such as a receiver identifier, may also be provided. The receiver identifier may include a serial number or model number of the user receiving device 26. An encrypted token may also be provided from the user device to the locator module. The encrypted token may be formed as described above and may include various types of encrypted data such as the site identifier, the site user identifier or receiver user identifier and the expiration date of the encrypted token.

Also, in step 1614 port information such as an IP address, port forwarding data, an access card identifier, a receiver identifier, a service identifier and a service description may also be provided to the locator module. In step 1616, the locator module may cross-reference the data provided in step 1614 against an account database. The account database may reside within the locator module or may reside within the authentication server 32 of the primary service provider. For example, the eToken web service 32A may be used to authenticate the web service, whereas the setup web service 32B may be used to setup and verify the information. Further, the account/billing web service 30 may also be used to determine billing information.

In step 1618, the locator module determines if the user device is associated with a valid customer and whether the account is in good standing. Again, this step may be performed at the locator module or at the primary service provider. In step 1620, if the customer is a valid customer and the account is not in good standing, step 1622 terminates the process. In step 1620, if the customer is a valid customer and the account is in good standing, step 1624 registers the user device within the locator module 70. In step 1626, the secure connection is no longer needed and thus the secure connection is terminated.

After registration of the user device with the locator module, other devices or services such as the partner service provider are able to locate the user receiving device and communicate services or partner service data thereto.

Figure 17:
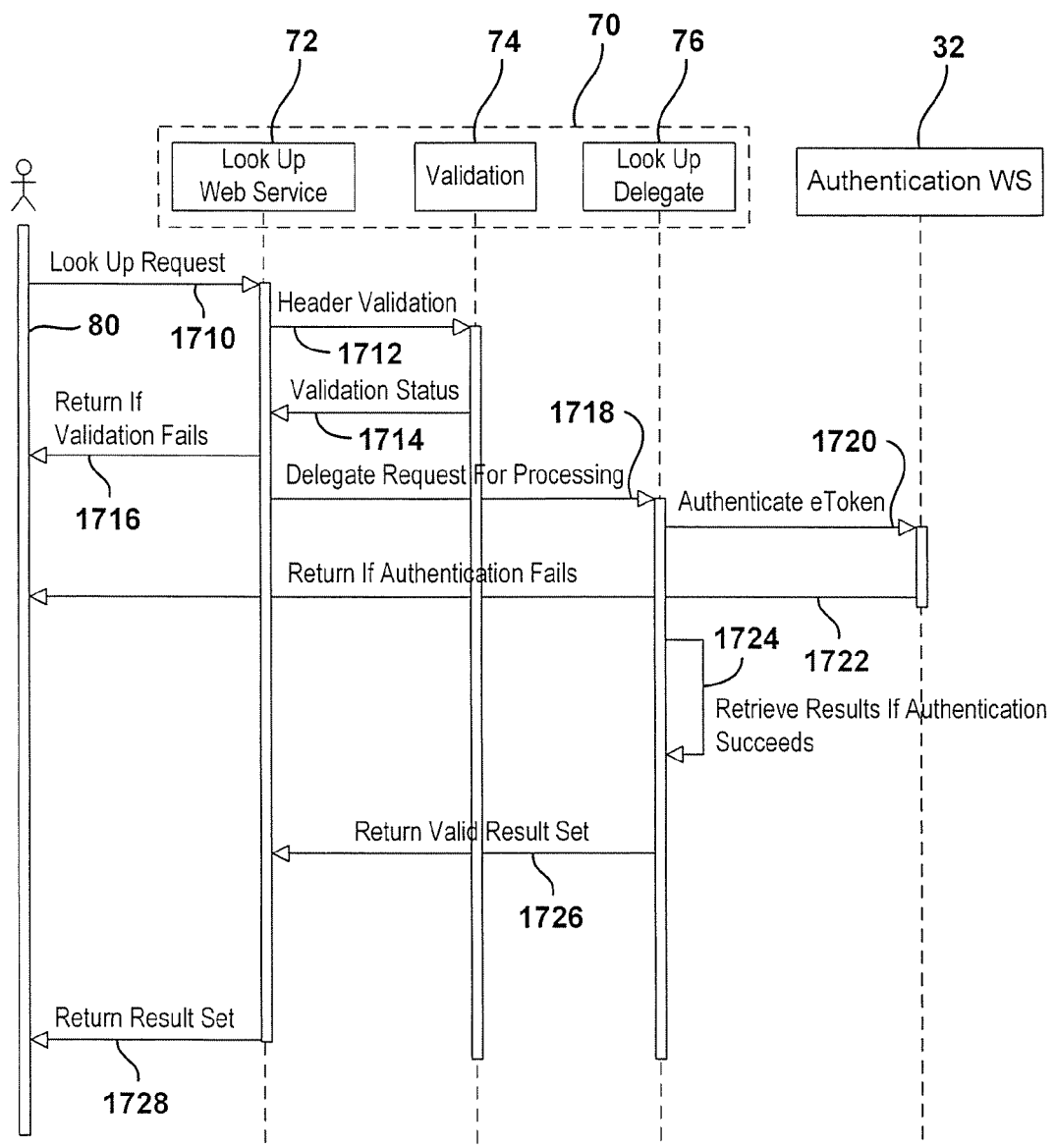
FIG. 17 is a sequence diagram of the look-up web service sequence.

Referring now to FIG. 17, a sequence diagram of the look-up web service is illustrated. In step 1710, a look-up request is generated from the partner service provider 80 or other type of requestor. It should be noted that the requester may also be another user device 26 that seeks access to another user receiving device. A look-up request generated in step 1710 is provided to the look-up web service 72. In step 1712, the header of the request may be validated in the validation module 74 of the locator module 70. In step 1714, a validation status is returned from the validation module 74 to the look-up web service 72. A validation failure signal is communicated from the look-up web service 72 to the partner service provider 80 or other requester if validation fails. In step 1718, if validation is successful, a delegate request for processing is provided to the look-up delegate 76. The request may include an eToken that is authenticated at the authentication web service 32 in step 1720. The authentication of an eToken is described above. In short, the encrypted token may be decrypted and its contents compared to other transmitted data. If authentication fails in step 1720, the authentication web service 32 may return an authentication failure signal to the partner service provider 80. In step 1720, if the authentication is successful, step 1724 is performed that retrieves the results if the authentication succeeds. In step 1726, a valid result set is returned to the look-up web service 72. In step 1728, the look-up web service, after receiving the valid result set in step 1726, returns the result set to the partner service provider in step 1728.

Figure 18:
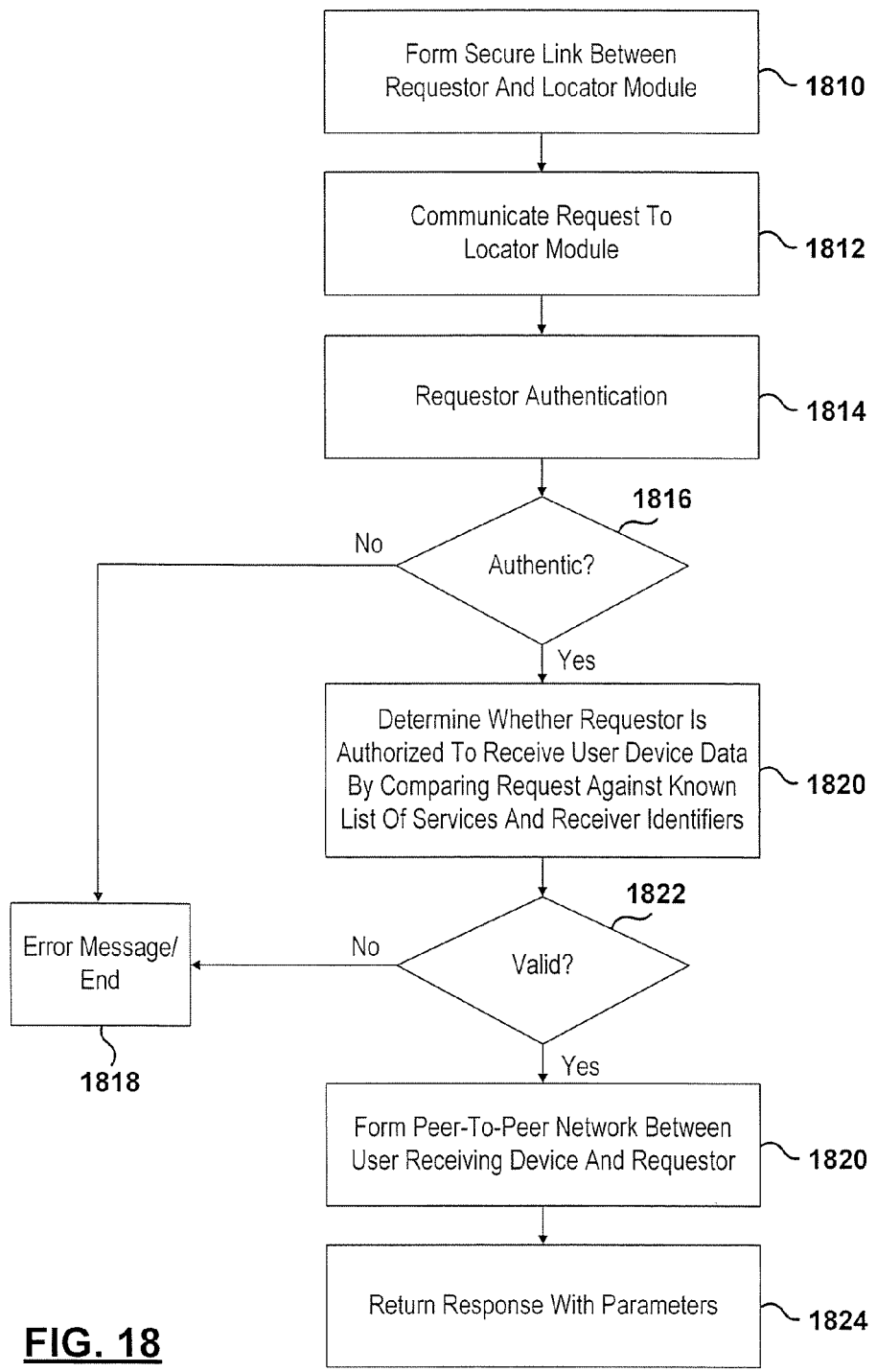
FIG. 18 is a flowchart of a method for communicating between a locator module and a user device.

Referring now to FIG. 18, further details of FIG. 17 are set forth. In step 1810, when a requester such as a partner service provider 80 or another user receiving device 26 desires direct communication with another user receiving device, a secure link between the requester and the locator module is formed. An SSL connection may be formed between the locator module and the requester. In step 1812, a request is communicated to the locator module. The request may include a site identifier, such as the partner service provider identifier, and a site user identifier. The site user identifier may correspond to the partner service provider identifier for the particular user receiving device. An eToken may also be provided. Data such as a service identifier and a receiver identifier may also be provided.

In step 1814, authentication of the identity of the requester may be performed. The authentication may take place by comparing the eToken to the information provided. That is, by decrypting the eToken and comparing the eToken values to the site ID and the user ID, authentication may take place. In step 1816, if the requester is not authenticated using the eToken, step 1818 generates an error message. In step 1816, if the requester is authenticated, step 1820 determines whether the requester is authorized to receive user device data by comparing the request against a known list of services and receiver identifiers. If the request is not valid in step 1822, step 1818 is performed in which an error message is generated. After step 1822, if the request is valid, step 1824 returns a response with various parameters. Once the response is generated, a peer-to-peer connection may be formed directly between the requester and the user receiving device in step 1826. The requestor may be a partner service provider communicating partner service data to the user receiving device. The user receiving device may also communicate data to the requestor. In addition, the user receiving device may receive primary service data or signals.

Figure 19:
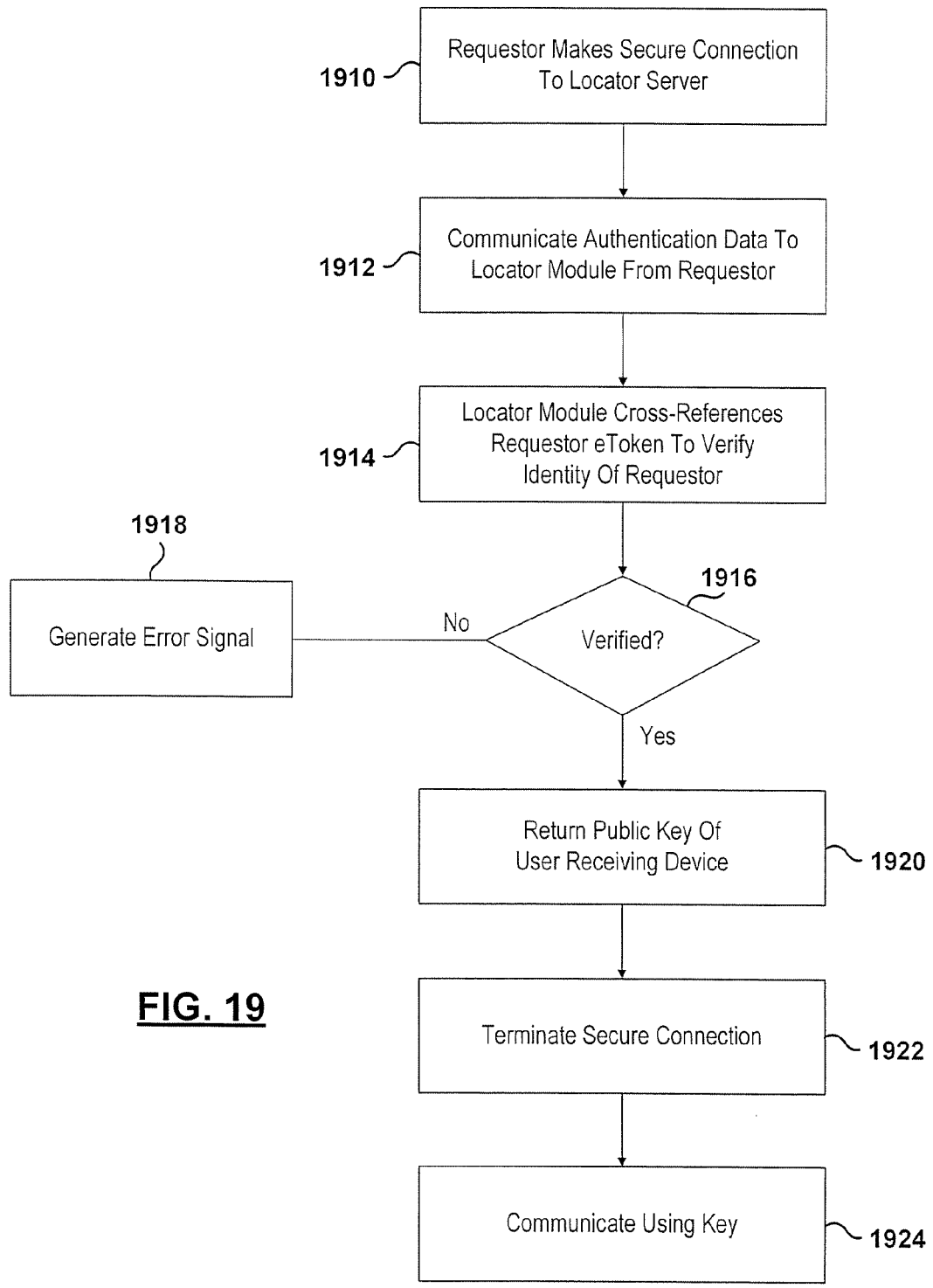
FIG. 19 is a flowchart of a method for retrieving a key from a user device.

Referring now to FIG. 19, the user receiving device and the partner service provider 80 may communicate using a key. Thus, the process described above in FIG. 18 may be modified to perform key retrieval. In step 1910, the requestor may make a secure connection to the locator server. In step 1912, authentication data may be provided to the locator module from the requestor. The locator or the authentication data may include a site identifier which may be a numeric or alphanumeric or alphabetical site identifier. A site user ID such as the partner service provider user identifier may be provided. An encrypted token may also be provided. The locator module may individually or through the primary service provider 14 verify the requestor eToken to verify the identity of the requestor in step 1914. In step 1916, if the identity is not verified, an error signal is generated in 1918. If the requestor is verified in step 1916, a public key of the user receiving device is communicated to the requestor. In step 1922, a secure connection is terminated once the public key is provided. In step 1924, communication between the user device and the requester, such as a partner service provider, may be provided using the key. Thus, using the key the various data may be encrypted and decrypted. One example is that a user datagram protocol (UDP) datagram may be encrypted. Thereafter, partner service provider data may then be provided in addition to primary service data.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of communicating with a user receiving device comprising:
   forming a secure communication connection between a user device locator module and a requestor;
   communicating a requestor identifier, a site user identifier and an encrypted token from the requestor through the secure communication connection to the user device locator module;
   verifying the requestor using the encrypted token;
   communicating user receiving device data comprising a service identifier and user receiving device location data from the user device locator module to the requestor;
   obtaining service data at the requestor based upon the service identifier;
   using the location data to establish a communication connection between the user receiving device and the requestor; and
   transmitting the service data between the requestor and the user receiving device using the connection.

2. A method as recited in claim 1 wherein forming a secure connection between a user device locator module and a requestor comprises forming a secure sockets layer connection between a user receiving device and a user device locator module.

3. A method as recited in claim 1 wherein forming a secure communication connection between a user device locator and a requestor comprises forming the secure communication connection between the user device locator and a second user receiving device.

4. A method as recited in claim 1 wherein forming a secure communication connection between a user device locator and a requestor comprises forming the secure communication connection between the user device locator and a partner service provider.

5. A method as recited in claim 1 further comprising communicating a service identifier corresponding to a service to the user device locator module and verifying the service is associated with the user receiving device.

6. A method as recited in claim 5 further comprising communicating a user device identifier to the user device locator module and wherein verifying the service is associated with the user receiving device comprises verifying the service is associated with the user receiving device in response to the user device identifier.

7. A method as recited in claim 1 wherein communicating user receiving device data comprises communicating a public key associated with the user receiving device.

8. A method as recited in claim 1 wherein communicating user receiving device data comprises communicating location data and a public key associated with the user receiving device.

9. A method as recited in claim 1 wherein communicating user receiving device data comprises communicating location data.

10. A method as recited in claim 1 wherein verifying of the requestor comprises verifying the requestor using an authentication server of a primary service provider.

11. A method as recited in claim 1 further comprising communicating primary service data to the user receiving device.

12. A method as recited in claim 11 wherein communicating primary service data comprises communicating primary service data through a satellite.

13. A system comprising:
    a user receiving device;
    a user device locator module;
    a requestor forming a secure communication connection with the user device locator module and communicating a requestor identifier, a site user identifier and an encrypted token through the secure communication connection;
    said user device locator module verifying the requestor using the encrypted token;
    said user device locator module communicating user receiving device data comprising a service identifier and user receiving device location data to the requestor;
    said requestor obtaining service data based upon the service identifier; and
    said requestor and the user receiving device using the user device location data to form a peer-to-peer network and transmitting the service data through the peer-to-peer network.

14. A system as recited in claim 13 wherein the user receiving device comprises a television receiving device.

15. A system as recited in claim 13 wherein the user receiving device comprises a satellite television receiving device.

16. A system as recited in claim 15 wherein a primary service provider communicates primary service data to the satellite television receiving device through a satellite.

17. A system as recited in claim 13 wherein the secure connection comprises a secure sockets layer connection.

18. A system as recited in claim 13 wherein the requestor comprises a second user receiving device.

19. A system as recited in claim 13 wherein the requestor comprises partner service provider and wherein the service data comprises partner service data.

20. A system as recited in claim 19 further comprising a primary service provider providing primary service data to the user receiving device.

21. A system as recited in claim 20 wherein the requestor communicates a service identifier corresponding to a service to the user device locator module and said user device locator module verifies the service is associated with the user receiving device.

22. A system as recited in claim 21 wherein the user device locator module verifies the service is associated with the user receiving device in response to a user device identifier.

23. A system as recited in claim 13 wherein the user receiving device data comprises a public key associated with the user receiving device.

24. A system as recited in claim 13 wherein the user receiving device data comprises location data and a public key associated with the user receiving device.

25. A system as recited in claim 13 wherein the user receiving device data comprises location data.

26. A system as recited in claim 13 wherein an authentication module is disposed within a primary service provider.

27. A method as recited in claim 1 wherein verifying the requestor comprises verifying the requestor using the encrypted token, requestor identifier and the site user identifier.

28. A system as recited in claim 13 wherein the user device locator module verifies the requestor using the encrypted token, requestor identifier and the site user identifier.

* * * * *